US012646822B2

(12) United States Patent
Oh et al.

(10) Patent No.: US 12,646,822 B2
(45) Date of Patent: Jun. 2, 2026

(54) ELECTRONIC DEVICE INCLUDING ANTENNA

(71) Applicant: SAMSUNG ELECTRONICS CO., LTD., Suwon-si (KR)

(72) Inventors: Chanhee Oh, Suwon-si (KR); Joon Heo, Suwon-si (KR); Soon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 494 days.

(21) Appl. No.: 18/108,999

(22) Filed: Feb. 13, 2023

(65) Prior Publication Data

US 2023/0198128 A1     Jun. 22, 2023

Related U.S. Application Data

(63) Continuation of application No. PCT/KR2022/016114, filed on Oct. 21, 2022.

(30) Foreign Application Priority Data

Dec. 1, 2021     (KR) ........................ 10-2021-0169894

(51) Int. Cl.
*H01Q 1/24*          (2006.01)
*H01Q 1/02*          (2006.01)
(Continued)

(52) U.S. Cl.
CPC .............. *H01Q 1/243* (2013.01); *H01Q 1/02* (2013.01); *H01Q 1/38* (2013.01); *H01Q 1/526* (2013.01);
(Continued)

(58) Field of Classification Search
CPC .......... H01Q 1/243; H01Q 1/02; H01Q 1/526; H01Q 1/38; H01Q 1/52; H01Q 1/24; H04B 5/26; H04B 5/43
See application file for complete search history.

(56) References Cited

U.S. PATENT DOCUMENTS 10,516,208 B2     12/2019  Lee et al.
11,431,082 B2      8/2022  Oh
(Continued)

FOREIGN PATENT DOCUMENTS

JP            5652470 B2      1/2015
KR      10-2014-0086363 A      7/2014
(Continued)

OTHER PUBLICATIONS

Communication dated Dec. 11, 2024, issued by European Patent Office in European Patent Application No. 22901575.5.
(Continued)

*Primary Examiner* — Tuan H Nguyen
(74) *Attorney, Agent, or Firm* — Sughrue Mion, PLLC

(57)          ABSTRACT

An electronic device is provided. The electronic device includes first and second printed circuit boards (PCBs); a flexible PCB (FPCB) connecting the first and second PCBs; and an antenna module between the first and second PCBs. The antenna module includes: a first pattern layer provided on a first substrate surface and forming a first coil pattern; a second pattern layer provided on a second substrate surface and forming a second coil pattern; an overlapping area in which the FPCB is provided between portions of the second pattern layer; and a plurality of pattern areas in which the portions of the second coil pattern are respectively provided.

17 Claims, 27 Drawing Sheets

(51) Int. Cl.

| | | |
|---|---|---|
| *H01Q 1/38* | (2006.01) | |
| *H01Q 1/52* | (2006.01) | |
| *H04B 5/26* | (2024.01) | |
| *H04B 5/43* | (2024.01) | |
| *H04M 1/02* | (2006.01) | |

(52) U.S. Cl.
CPC ................ *H04B 5/26* (2024.01); *H04B 5/43* (2024.01); *H04M 1/026* (2013.01)

(56) References Cited

U.S. PATENT DOCUMENTS

| | | | |
|---|---|---|---|
| 11,775,015 | B2 | 10/2023 | Lee et al. |
| 2016/0028159 | A1 | 1/2016 | Moon et al. |
| 2020/0267834 | A1 | 8/2020 | Lee et al. |
| 2020/0411953 | A1 | 12/2020 | Oh |
| 2020/0411989 | A1 | 12/2020 | Oh |
| 2022/0149669 | A1 | 5/2022 | Kim et al. |

FOREIGN PATENT DOCUMENTS

| | | | |
|---|---|---|---|
| KR | 1020160129336 | A | 11/2016 |
| KR | 102031091 | B1 | 10/2019 |
| KR | 1020200001282 | A | 1/2020 |
| KR | 1020200101809 | A | 8/2020 |
| KR | 10-2021-0001059 | A | 1/2021 |
| KR | 1020210000999 | A | 1/2021 |
| KR | 1020210006835 | A | 1/2021 |
| KR | 10-2021-0017089 | A | 2/2021 |
| KR | 1020210037092 | A | 4/2021 |

OTHER PUBLICATIONS

International Search Report (PCT/ISA/210) issued by the International Searching Authority on Jan. 27, 2023 in International Patent Application No. PCT/KR2022/016114.

Communication issued Jan. 16, 2024 by the Korean Intellectual Property Office in Korean Application No. 10-2021-0169894.

200

Antenna module 297

490

490-1

490-2

463

Y

Z ⊙ → X

ELECTRONIC DEVICE INCLUDING ANTENNA

CROSS-REFERENCE TO RELATED APPLICATIONS

This application is a continuation application of International Application No. PCT/KR2022/016114 designating the United States, filed on Oct. 21, 2022, in the Korean Intellectual Property Receiving Office and claiming priority to Korean Patent Application No. 10-2021-0169894, filed on Dec. 1, 2021, in the Korean Intellectual Property Office, the disclosures of which are incorporated by reference herein in their entireties.

BACKGROUND

1. Field

The disclosure relates to an electronic device including an antenna.

2. Description of Related Art

There is continuous demand for an electronic device, such as a portable terminal, with reduced size and increased functionality. Various components and substrates are mounted in the electronic device to perform the respective functions and such parts may be connected through a flexible printed circuit board (FPCB).

Miniaturization of an electronic device is required to improve portability and aesthetics. Since various parts are provided in the electronic device, technology for effectively using an inner space of the miniaturized electronic device is being developed. Also, when internal parts of the electronic device are connected through a flexible printed circuit board (FPCB), an internal arrangement structure of the electronic device may be optimized by designing a shape of the FPCB to not overlap other parts (e.g., an antenna, a battery, etc.).

SUMMARY

Provided are an electronic device including an antenna.

In accordance with an aspect of the disclosure, an electronic device includes: a display including a first area and a second area; a housing structure including a first housing supporting the first area and a second housing supporting the second area, wherein an inner space is provided between the housing structure and a rear surface of the display; a hinge structure foldably connecting the first housing and the second housing based on a folding axis so that the first housing and the second housing are foldable relative to each other on the folding axis between a first state in which the first area and the second area are substantially coplanar and a second state in which the first area and the second area face each other; a first printed circuit board (PCB) provided in the inner space; a second PCB provided in the inner space; a flexible PCB (FPCB) connecting the first PCB and the second PCB; and an antenna module provided in the inner space of the housing structure and overlapping the FPCB along a direction perpendicular to the rear surface of the display. The antenna module includes: a base member including a first surface, and a second surface opposite to the first surface and facing the FPCB; a first pattern layer provided on the first surface of the base member and forming a first coil pattern; a second pattern layer provided on the second surface of the base member and forming a second coil pattern; an overlapping area in which the FPCB is provided between portions of the second pattern layer; and a plurality of pattern areas in which the portions of the second coil pattern are respectively provided.

The antenna module may further include a plurality of vias provided in each of the plurality of pattern areas and electrically connecting the portions of the second coil pattern provided in each of the plurality of pattern areas to the first coil pattern.

The antenna module may further include a first shielding layer provided in the plurality of pattern areas on the second pattern layer.

The antenna module may further include a second shielding layer provided in the overlapping area on the second surface of the base member.

The first shielding layer and the second shielding layer may form an integrated shielding layer.

The first shielding layer may be spaced apart from the second shielding layer.

The antenna module may further include a heat dissipation layer in the plurality of pattern areas on the first shielding layer.

The FPCB may be provided in the overlapping area, and a surface of the second pattern layer may have a height substantially equal to or greater than that of a surface of the FPCB along the direction perpendicular to the rear surface of the display.

The plurality of pattern areas may include a first pattern area and a second pattern area that are separated from each other by the overlapping area, and a portion of the second coil pattern may be provided in each of the first pattern area and the second pattern area.

The antenna module may further include a plurality of vias electrically connecting the first coil pattern and the second coil pattern. The first coil pattern may include a first separation pattern and a second separation pattern that are separate from each other. Each of the first separation pattern and the second separation pattern may be connected, through the plurality of vias, to the second coil pattern in the first pattern area and the second coil pattern in the second pattern area.

The electronic device may further include a battery provided in the inner space of the housing structure. The battery may overlap the overlapping area along the direction perpendicular to the rear surface of the display.

The FPCB may extend through the antenna module in a substantially straight line.

The overlapping area may include a first overlapping area extending in a first longitudinal direction and a second overlapping area connected to the first overlapping area and extending a second longitudinal direction that crosses the first longitudinal direction. The FPCB may be provided in the first overlapping area and the second overlapping area.

The first longitudinal direction may be substantially perpendicular to the second longitudinal direction.

The overlapping area and the FPCB may have substantially common widths in the overlapping area.

In accordance with an aspect of the disclosure, an electronic device includes: a housing including a front surface, a rear surface, and a side surface between the front surface and the rear surface; a display; a first printed circuit board (PCB) provided in an inner space of the housing; a second PCB provided in the inner space of the housing and spaced apart from the first PCB; an antenna module provided in the inner space of the housing; and a flexible PCB (FPCB) connecting the first PCB and the second PCB and extending in a first direction through the antenna module. The antenna module includes: a base member including a first surface, and a second surface opposite to the first surface and facing the FPCB; a first pattern layer provided on the first surface of the base member and forming a first coil pattern; a second pattern layer provided on the second surface of the base member and forming a plurality of second coil patterns; a plurality of pattern areas respectively corresponding to the plurality of second coil patterns; and an overlapping area in which the FPCB is provided, wherein the overlapping area separates the plurality of second coil patterns from each other.

The antenna module may further include a plurality of vias extending through the base member in each of the plurality of pattern areas and electrically connecting the plurality of second coil patterns to the first coil pattern.

The antenna module may further include: a first shielding layer provided in each of the plurality of pattern areas on the second pattern layer; and a second shielding layer provided in the overlapping area between the second surface and the FPCB.

The electronic device may further include a battery provided in the space of the housing. The overlapping area and the battery may overlap along a second direction perpendicular to the first direction.

In accordance with an aspect of the disclosure, an electronic device includes: a display including a first area and a second area; a first housing supporting the first area and forming a first space; a second housing supporting the second area and forming a second space; a hinge structure foldably connecting the first housing and the second housing based on a folding axis so that the first housing and the second housing are foldable relative to each other on the folding axis between a first state in which the first area and the second area are substantially coplanar and a second state in which the first area and the second area face each other; a first printed circuit board (PCB) provided in the first space; a second PCB provided in the second space; a flexible PCB (FPCB) connecting the first PCB and the second PCB and extending across the hinge structure; an antenna module provided in the first space or the second space, and overlapping the FPCB along a direction perpendicular to a surface of the display; and a battery provided in the first space or the second space, and overlapping the antenna module along the direction. The antenna module includes: a base member including a first surface, and a second surface opposite to the first surface and facing the FPCB; a first pattern layer provided on the first surface of the base member and forming a first coil pattern; a second pattern layer provided on the second surface of the base member and forming a second coil pattern; a plurality of vias electrically connecting the first coil pattern and the second coil pattern, and passing through the base member; and an overlapping area in which the FPCB is provided between portions of the second pattern layer.

In accordance with an aspect of the disclosure, an antenna module includes: a first coil provided on a first surface of a substrate; a first portion of a second coil provided on a second surface of the substrate; a second portion of the second coil provided on the second surface of the substrate and separated from the first portion of the second coil; and a plurality of vias that extend through the substrate and electrically connect the first portion of the second coil to the first coil, and the second portion of the second coil to the first coil.

Side surfaces of the first portion of the second coil and the second portion of the second coil may face each other, may be substantially perpendicular to the second surface of the substrate, and may define a space configured to accommodate a flexible printed circuit board.

The antenna module may further include a shielding layer that extends on the second surface of the substrate between the first portion of the second coil and the second portion of the second coil.

The antenna module may further include: a first shielding layer provided on the first portion of the second coil and the second portion of the second coil; and a second shielding layer that extends on the second surface of the substrate between the first portion of the second coil and the second portion of the second coil.

The antenna module may further include vertical shielding portions electrically connecting the first shielding layer and the second shielding layer.

A space may be provided on the second surface of the substrate between the first portion of the second coil and the second portion of the second coil.

The antenna module may further include a flexible printed circuit board that extends on the second surface of the substrate between the first portion of the second coil and the second portion of the second coil.

The antenna module may further include a battery. The flexible printed circuit board, the substrate and the battery may overlap each other along a direction perpendicular to the first surface of the substrate.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
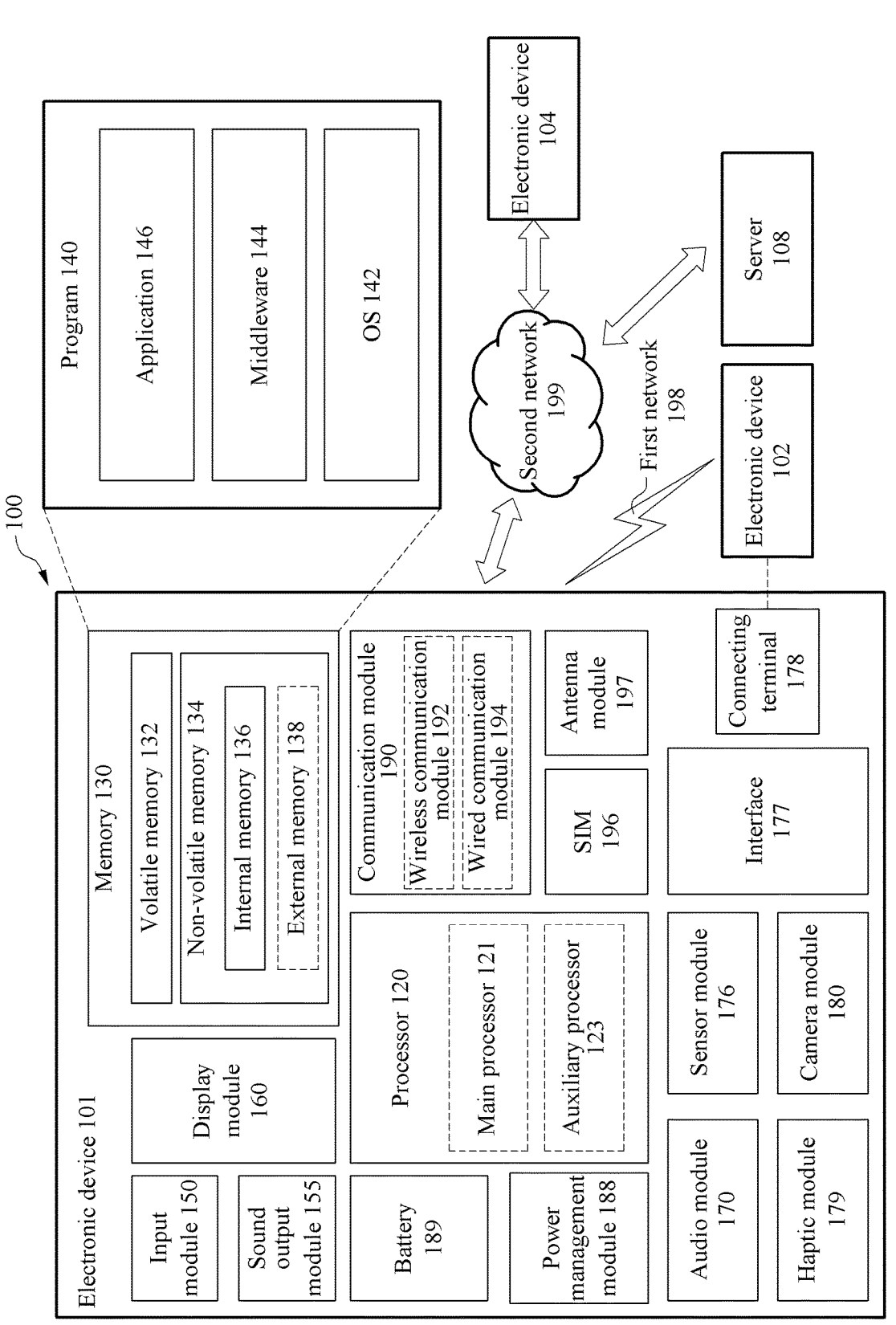
FIG. 1 is a block diagram illustrating an example electronic device in a network environment according to embodiments.

Hereinafter, various example embodiments will be described in greater detail with reference to the accompanying drawings. Like reference numerals refer to like elements and a repeated description related thereto will be omitted.

FIG. 1 is a block diagram illustrating an electronic device 101 in a network environment 100 according to embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include a slit antenna, and/or an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
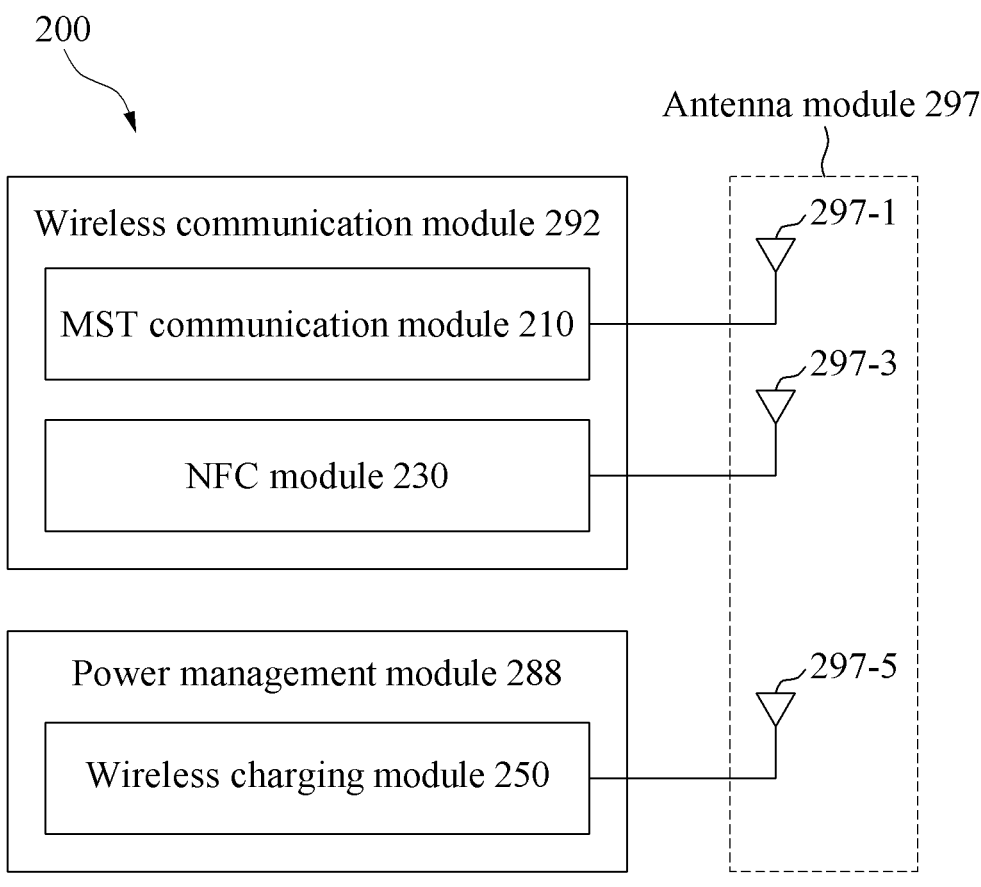
FIG. 2 is a block diagram illustrating a wireless communication module, a power management module, and an antenna module of an electronic device according to embodiments.

FIG. 2 is a block diagram illustrating a wireless communication module 292, a power management module 288, and an antenna module 297 of an electronic device 200 (e.g., the electronic device 101 of FIG. 1) according to embodiments. Referring to FIG. 2, the wireless communication module 292 may include a magnetic secure transmission (MST) communication module 210 or a near field communication (NFC) module 230, and the power management module 288 may include a wireless charging module 250. In this case, the antenna module 297 may include a plurality of antennas including an MST antenna 297-1 connected to the MST communication module 210, an NFC antenna 297-3 connected to the NFC module 230, and a wireless charging antenna 297-5 connected to the wireless charging module 250. For clarity of description, an overlapping component of FIG. 1 may be omitted or briefly described.

The MST communication module 210 may receive a signal including control information or payment information such as card information from the processor 120 and generate a magnetic signal corresponding to the received signal and then deliver the generated magnetic signal to the external electronic device (e.g., a POS device) (e.g., the electronic device 102 of FIG. 1) through the MST antenna 297-1. To generate the magnetic signal, according to an embodiment, the MST communication module 210 may include a switching module (not shown) including one or more switches connected to the MST antenna 297-1 and may control the switching module to change a direction of voltage or current supplied to the MST antenna 297-1 according to the received signal. Change in the direction of voltage or current enables a direction of the magnetic signal (e.g., a magnetic field) transmitted through the MST antenna 297-1 to be changed accordingly. When the magnetic signal is detected by the external electronic device, the magnetic signal in a direction shifted state may cause the similar effect (e.g., a waveform) as the magnetic field that is generated while a magnetic card corresponding to the received signal (e.g., card information) is being swiped by a card reader of the electronic device 102. According to an embodiment, payment related information and a control signal received in a form of the magnetic signal by the electronic device 102 may be transmitted to an external server 208 (e.g., a payment server) through a network.

The NFC module 230 may acquire a signal including control information or payment information, such as card information, from the processor 120 and may transmit the acquired signal to the external electronic device 102 through the NFC antenna 297-3. According to an embodiment, the NFC module 230 may receive such a signal transmitted from the external electronic device 102 through the NFC antenna 297-3.

The wireless charging module 250 may wirelessly transmit power to the external electronic device 102 (e.g., a mobile phone or a wearable device) or may wirelessly receive power form the external electronic device 102 (e.g., a wireless charging device) through the wireless charging antenna 297-5. The wireless charging module 250 may support at least one of various wireless charging methods including, for example, a magnetic resonance method and a magnetic induction method.

According to an embodiment, some antennas among the MST antenna 297-1, the NFC antenna 297-3, and the wireless charging antenna 297-5 may share at least a portion of an emitter. For example, an emitter of the MST antenna 297-1 may be used as that of the NFC antenna 297-3 or the wireless charging antenna 297-5, or vice versa. In this case, the antenna module 297 may include a switching circuit (not shown) configured to selectively connect (e.g., close) or separate (e.g., open) at least a portion of the antennas 297-1, 297-3, and 297-3 under control of the wireless communication module 292 (e.g., the MST communication module 210 or the NFC module 230) and the power management module 288 (e.g., the wireless charging module 250). For example, when the electronic device 200 uses a wireless charging function, the NFC module 230 or the wireless charging module 250 may control the switching circuit to temporarily separate at least a partial area of the emitter shared between the NFC antenna 297-3 and the wireless charging antenna 297-5 from the NFC antenna 297-3 and may connect the same to the wireless charging antenna 297-5.

According to an embodiment, at least one function of the MST communication module 210, the NFC module 230, or the wireless charging module 250 may be controlled by the processor 120. According to an embodiment, designated functions (e.g., a payment function) of the MST communication module 210 or the NFC module 230 may be performed in a trusted execution environment (TEE). The TEE according to embodiments may form an execution environment in which at least a partially designated area of the memory (e.g., the memory 130 of FIG. 1) is allocated to be used to perform a function (e.g., a function related to financial transaction or personal information) that requires a relatively high level of security. In this case, an approach to the designated area may be restrictedly allowed according to an entity that accesses the designated area or an application executed in the TEE.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment, the electronic device is not limited to those described above.

It should be appreciated that embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. For example, the expression, "at least one of A, B and C," should be understood as including only A, only B, only C, both A and B, both A and C, both B and C, or all of A, B, and C. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used in connection with embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to an embodiment, one or more methods according to embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3A:
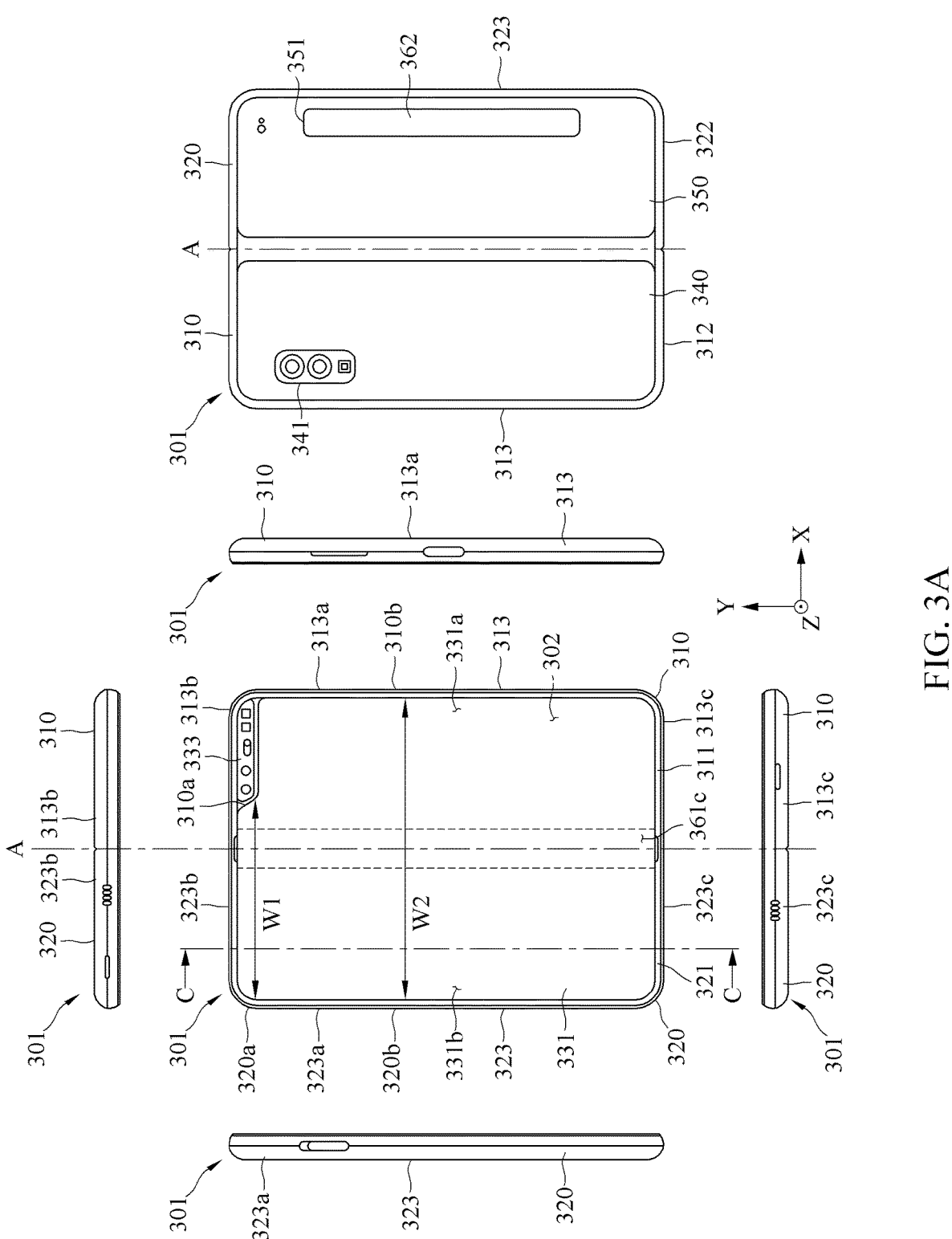
FIG. 3A illustrates an unfolded state of an electronic device according to embodiments.
Figure 3B:
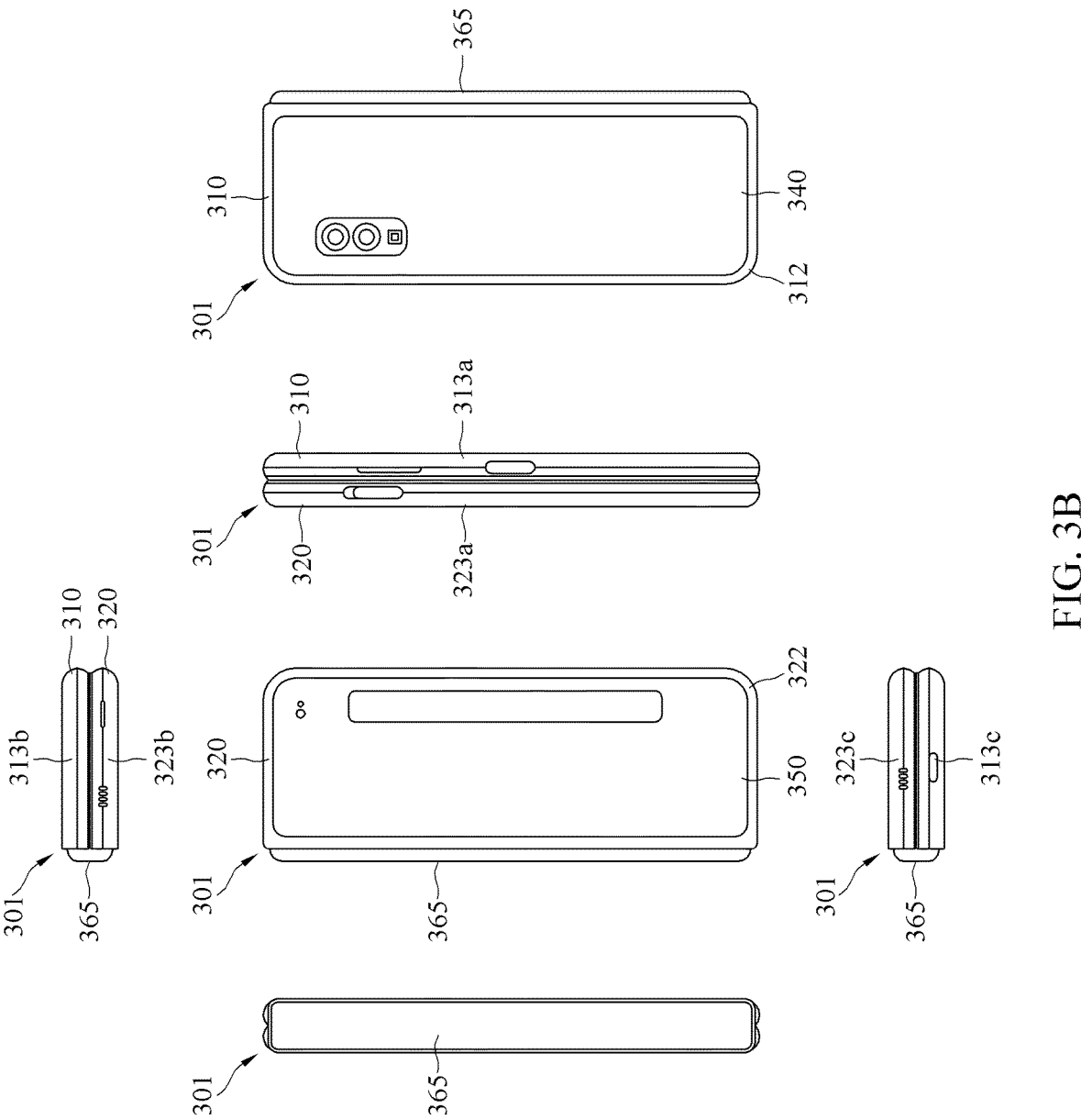
FIG. 3B illustrates a folded state of an electronic device according to embodiments.
Figure 3C:
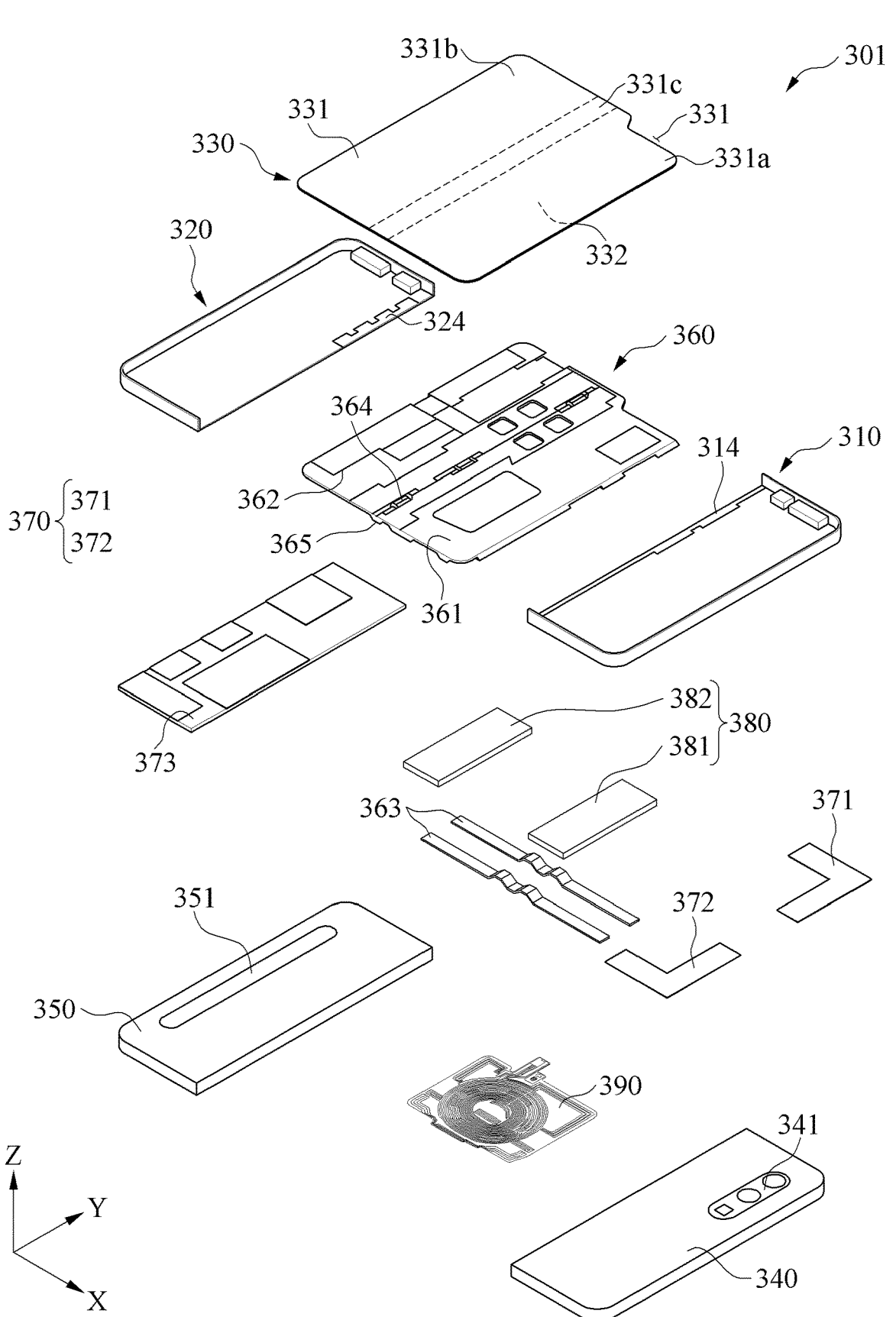
FIG. 3C is an exploded perspective view illustrating an electronic device according to embodiments.

FIG. 3A illustrates an unfolded state of an electronic device according to embodiments, FIG. 3B illustrates a folded state of an electronic device according to embodiments, and FIG. 3C is an exploded perspective view illustrating an electronic device according to embodiments.

Referring to FIGS. 3A, 3B, and 3C, an electronic device 301 (e.g., the electronic device 101 of FIG. 1) according to embodiments may include a pair of housings 310 and 320 configured to rotatably couple through a hinge structure to be folded against each other, a hinge cover 365 configured to cover a foldable portion of the single pair of housings 310 and 320, and a display 330 (e.g., a flexible display or a foldable display) provided in a space formed by the single pair of housings 310 and 320, a hinge assembly 360, a substrate 370, and a heat dissipation member.

In an embodiment, the electronic device 301 may include the first housing 310 including a sensor area 333, the second housing 320, a first rear cover 340, and a second rear cover 350. The single pair of housings 310 and 320 of the electronic device 301 are not limited to a shape or a combination and/or coupling of parts of FIGS. 3A and 3B and may be implemented in another shape or combination and/or coupling of other parts.

In an embodiment, the first housing 310 and the second housing 320 may be provided at both sides based on a folding axis A and may be substantially symmetrically provided with respect to the folding axis A. In an embodiment, an angle or a distance formed by the first housing 310 and the second housing 320 may vary depending on whether the electronic device 301 is in an unfolded state, a folded state, or an intermediate state. In an embodiment, dissimilar to the second housing 320, the first housing 310 includes the sensor area 333 in which various sensor modules (e.g., the sensor module 176 of FIG. 1) are provided. In other areas, the first housing 310 and the second housing 320 may have a symmetrical shape. In some embodiments, the sensor area 333 may be replaced with at least a partial area of the second housing 320. For example, the sensor area 333 may include a camera hole area, a sensor hole area, an under display camera (UDC) area and/or a under display sensor (UDS) area.

In an embodiment, the first housing 310 may be connected to the hinge structure in an unfolded state of the electronic device 301. The first housing 310 may include a first housing surface 311 provided to face the front surface of the electronic device 301, a second housing surface 312 configured to face an opposite direction of the first housing surface 311, and a first side portion 313 configured to surround at least a portion of a space between the first housing surface 311 and the second housing surface 312. The first side portion 313 may include a first side surface 313a provided (e.g., disposed) substantially parallel to the folding axis A, a second side surface 313b configured to extend from one end of the first side surface 313a in a direction substantially perpendicular to the folding axis A and a third side surface 313c configured to extend from another end of the first side surface 313a in a direction substantially perpendicular to the folding axis A and substantially parallel to the second side surface 313b. The second housing 320 may be connected to the hinge structure in the unfolded state of the electronic device 301. The second housing 320 may include a third housing surface 321 provided to face the front surface of the electronic device 301, a fourth housing surface 322 provided to face an opposite direction of the third housing surface 321, and a second side portion 323 configured to surround at least a portion of a space between the third housing surface 321 and the fourth housing surface 322. The second side portion 323 may include a fourth side surface 323a provided substantially parallel to the folding axis A, a fifth side surface 323b configured to extend from one end of the fourth side surface 323a in a direction substantially perpendicular to the folding axis A, and a sixth side surface 323c configured to extend from another end of the fourth side surface 323a in a direction substantially perpendicular to the folding axis A and substantially parallel to the fifth side surface 323b. The first housing surface 311 and the third housing surface 321 may face each other when the electronic device 301 is in a folded state.

In an embodiment, the electronic device 301 may include a recess-shaped accommodation portion 302 configured to accommodate the display 330 through structural coupling of the first housing 310 and the second housing 320. The accommodation portion 302 may have the substantially same size as that of the display 330. In an embodiment, due to the sensor area 333, the accommodation portion 302 may have two or more different widths in a direction perpendicular to the folding axis A. For example, the accommodation portion 302 may have a first width $W1$ between a first portion 310a formed at an edge of the sensor area 333 in the first housing 310 and a second portion 320a parallel to the folding axis A in the second housing 320 and a second width $W2$ between a third portion 310b non-overlapping the sensor area 333 and parallel to the folding axis A in the first housing 310 and a fourth portion 320b in the second housing 320. Here, the second width $W2$ may be greater than the first width $W1$.

That is, the accommodation portion 302 may be formed to have the first width $W1$ from the first portion 310a of the first housing 310 to the second portion 320a of the second housing 320 having a symmetrical shape with respect to each other and the second width $W2$ from the third portion 310b of the first housing 310 to the fourth portion 320b of the second housing 320. The first portion 310a and the third portion 310b of the first housing 310 may be formed at different distances from the folding axis A. The width of the accommodation portion 302 is not limited to the illustrated example. For example, the accommodation portion 302 may have three or more different widths depending on a shape of the sensor area 333 or an asymmetrical shape of the first housing 310 and the second housing 320.

In an embodiment, at least a portion of the first housing 310 and the second housing 320 may be formed of a metallic material or a nonmetallic material having a rigidity suitable for supporting the display 330.

In an embodiment, the sensor area 333 may be formed adjacent to one corner of the first housing 310. Here, an arrangement, a shape, or a size of the sensor area 333 is not limited to the illustrated example. In other embodiments, the sensor area 333 may be formed in another corner or a predetermined area of an upper corner and a lower corner of the first housing 310. In some embodiments, the sensor area 333 may be formed to extend between the first housing 310 and the second housing 320.

In an embodiment, the electronic device 301 may include at least one component for performing various functions that are displayed to be exposed on the front surface of the electronic device 301 through the sensor area 333 or at least one opening formed in the sensor area 333. For example, the component may include at least one of a front camera module, a receiver, a proximity sensor, an illuminance sensor, a biometric sensor (e.g., an iris recognition sensor), an ultrasonic sensor, and an indicator.

In an embodiment, the first rear cover 340 may be provided (e.g., disposed) on the second housing surface 312 of the first housing 310 and may have substantially rectangular edges. At least a portion of the edges of the first rear cover 340 may be surrounded by the first housing 310. The second rear cover 350 may be provided on the fourth housing surface 322 of the second housing 320 and may have substantially rectangular edges. At least a portion of the edges of the second rear cover 350 may be surrounded by the second housing 320.

In an embodiment, the first rear cover 340 and the second rear cover 350 may have a substantially symmetrical shape based on the folding axis A. In another embodiment, the first rear cover 340 and the second rear cover 350 may have different shapes. In still another embodiment, the first housing 310 and the first rear cover 340 may be integrally formed, and the second housing 320 and the second rear cover 350 may be integrally formed.

In an embodiment, the first housing 310, the second housing 320, the first rear cover 340, and the second rear cover 350 may provide a space in which various components (e.g., a printed circuit board (PCB), the antenna module 197 of FIG. 1, the sensor module 176 of FIG. 1, or the battery 189 of FIG. 1) of the electronic device 301 through an interconnected structure. In an embodiment, at least one component may be visually exposed on the rear surface of the electronic device 301. For example, at least one component may be visually exposed through a first rear area 341 of the first rear cover 340. Here, the component may include a proximity sensor, a rear camera module, and/or a flash. In an embodiment, at least a portion of a sub-display 362 may be visually exposed through a second rear area 351 of the second rear cover 350. In an embodiment, the electronic device 301 may include a sound output module (e.g., the sound output module 155 of FIG. 1) that is provided through at least a partial area of the second rear cover 350.

In an embodiment, the display 330 may be provided (e.g., disposed) in the accommodation portion 302 formed by the single pair of housings 310 and 320. For example, the display 330 may be provided to occupy a substantially all of an area of the front surface of the electronic device 301. The front surface of the electronic device 301 may include an area in which the display 330 is provided, a partial area (e.g., an edge area) of the first housing 310 adjacent to the display 330, and a partial area (e.g., an edge area) of the second housing 320. The rear surface of the electronic device 301 may include the first rear cover 340, a partial area (e.g., an edge area) of the first housing 310 adjacent to the first rear cover 340, the second rear cover 350, and a partial area (e.g., an edge area) of the second housing 320 adjacent to the second rear cover 350. In an embodiment, at least a partial area of the display 330 may be deformable to a planar surface or a curved surface. In an embodiment, the display 330 may include a folding area 331c, a first area 331a provided in a first side (e.g., right) based on the folding area 331c, and a second area 331b provided in a second side (e.g., left) based on the folding area 331c. The first area 331a may be positioned on the first housing surface 311 of the first housing 310 and the second area 331b may be positioned on the third housing surface 321 of the second housing 310. Here, area division of the display 330 is provided as an example only and the display 330 may be divided into a plurality of areas according to a structure or a function of the display 330. The above area division of the display 330 refers to only a physical division by the single pair of housings 310 and 320 and the hinge structure. Practically, the display 330 may display a substantially single screen through the single pair of housings 310 and 320 and the hinge structure. In an embodiment, the first area 331a may include a notch area formed along the sensor area 333, and the first area 331a and the second area 331b may have a substantially symmetrical shape in other areas. In another embodiment, because the sensor area 333 is not exposed in the first area 331a or the second area 331b, the first area 331a and the second area 331b may have a substantially symmetrical shape based on the folding axis A.

In an embodiment, the hinge cover 365 may be provided (e.g., disposed) between the first housing 310 and the second housing 320 and configured to cover the hinge structure. The hinge cover 365 may be hidden or exposed to the outside by at least a portion of the first housing 310 and the second housing 320 according to an operating state of the electronic device 301. For example, referring to FIG. 3A, when the electronic device 301 is in the unfolded state, the hinge cover 365 may be hidden by the first housing 310 and the second housing 320 to not be exposed to the outside. Referring to FIG. 3B, when the electronic device 301 is in the folded state, the hinge cover 365 may be exposed to the outside between the first housing 310 and the second housing 320. When the electronic device 301 is in an intermediate state that forms an angle between the unfolded state of FIG. 3A and the folded state of FIG. 3B, at least a portion of the hinge cover 365 may be exposed to the outside between the first housing 310 and the second housing 320. In this case, an area in which the hinge cover 365 is exposed to the outside may be smaller than an exposed area of the hinge cover 365 in the folded state of the electronic device 301. In an embodiment, the hinge cover 365 may include a curved shape.

In an embodiment, when the electronic device 301 is in the unfolded state (e.g., the unfolded state of FIG. 3A), the first housing 310 and the second housing 320 may form a first angle (e.g., about 180 degrees) and the first area 331a and the second area 331b of the display 330 may be oriented in substantially the same direction. The folding area 331c of the display 330 may be substantially coplanar with the first area 331a and the second area 331b. In another embodiment, when the electronic device 301 is in the unfolded state, the first housing 310 may rotate at a second angle (e.g., about 360 degrees) relative to the second housing 320, such that the second housing surface 312 and the fourth housing surface 322 may be reversely folded to face each other. Also, when the electronic device 301 is in the folded state (e.g., the folded state of FIG. 3B), the first housing 310 and the second housing 320 may face each other. The first housing 310 and the second housing 320 may form an angle of about 0 to 10 degrees and the first area 331a and the second area 331b of the display 330 may face each other. In this case, at least a portion of the folding area 331c of the display 330 may be deformed to a curved surface. In an embodiment, when the electronic device 301 is in the intermediate state, the first housing 310 and the second housing 320 may form a specific angle. In this case, an angle (e.g., a third angle, about 90 degrees) formed by the first area 331a and the second area 331b of the display 330 may be greater than the angle when the electronic device 301 is in the folded state and may be less than the angle when the electronic device 301 is in the unfolded state. In this case, the folding area 331c may be deformed to have a curvature less than a curvature of the curved surface of the electronic device 301 that is in the folded state.

In an embodiment, the display 330 may include a display panel 331 (e.g., a flexible display panel) and at least one plate 332 or layer provided (e.g., disposed) on the rear surface of the display panel 331.

In an embodiment, the display panel 331 may include a display substrate having flexibility, a plurality of display elements configured to form some pixels in coupling with the display substrate, at least one conductive line configured to couple to the display substrate and to electrically connect to other display elements, and a thin film encapsulation layer configured to prevent inflow of oxygen and moisture from the outside. In an embodiment, a touch panel may be provided to or integrally formed with the display panel 331.

Although the display substrate may be formed of a flexible material, for example, a plastic material, such as polyimide (PI), the material of the display substrate is not limited thereto and may include various materials having a flexible property. The plurality of display elements may be provided on the display substrate and may form some pixels. For example, the plurality of display elements may be arranged in a matrix form on the display substrate and may form pixels of the display panel 331. In this case, the plurality of display elements may include a fluorescent material or an organic fluorescent material capable of expressing a color. For example, the display elements may include an organic light emitting diode (OLED). The conductive line may include at least one gate signal line or at least one data signal line. For example, the conductive line may include a plurality of gate signal lines and a plurality of data signal lines, and the plurality of gate signal lines and the plurality of data signal lines may be arranged in a matrix form. In this case, the plurality of display elements may be provided adjacent to a point at which a plurality of lines intersects and may be electrically connected to each line. The thin film encapsulation layer may prevent inflow of oxygen and moisture from the outside by covering the display substrate, the plurality of display elements, and the conductive line. In an embodiment, the thin film encapsulation layer may be stacked such that at least one organic film layer and at least one inorganic film layer may be alternately provided.

In an embodiment, the touch panel may be integrally formed with or attached to the display panel 331. For example, the touch panel may be formed in such a manner that an aluminum metal mesh sensor is patterned on the thin film encapsulation layer of the display panel 331.

In an embodiment, a polarizing film may be provided between the display panel 331 and the touch panel. The polarizing film may improve visibility of the display 330. The polarizing film may shift a phase of light that passes through the display 330. For example, the polarizing film may prevent light incident on the display panel 331 from being reflected by converting linearly polarized light to circularly polarized light or by converting the circularly polarized light to the linearly polarized light.

A window layer may be formed using a transparent plastic film having high flexibility and high hardness. For example, the window layer may be formed using a polyimide (PI) or polyethylene terephthalate (PET) film. In an embodiment, the window layer may be include a plurality of layers, such as a plurality of plastic films.

In an embodiment, the plate 332 may support the rear surface of the display panel 331 and thereby improve impact resistance of the display panel 331. In an embodiment, the plate 332 may be divided to support the rear surface of each of the first area 331*a* and the second area 331*b* of the display panel 331. In this case, the respective areas of the plate 332 may be dividedly attached to the rear surfaces of the first area 331*a* and the second area 331*b* of the display 330 to not be in contact with each other along the folding axis A. According to the above structure, the plate 332 may not interfere with a folding operation of the display 330 that is performed along the folding axis A.

In an embodiment, the plate 332 may be formed of a conductive material, for example, copper or a synthetic material that includes copper. In this case, the plate 332 may improve impact resistance of the display 330, and at the same time, serve as a heat transfer path of delivering heat generated in an internal part (e.g., an application processor (AP)) of the electronic device 301 to the display panel 331.

The hinge assembly 360 may include a first support plate 361, a second support plate 362, a hinge housing provided between the first support plate 361 and the second support plate 362, and the hinge cover 365 configured to cover the hinge housing when being viewed from the outside.

In an embodiment, the first support plate 361 may be positioned in a rear direction of the first area 331*a* of the display 330 and the second support plate 362 may be positioned in a rear direction of the second area 331*b* of the display 330.

In an embodiment, an FPCB 363 and at least a portion 364 of the hinge structure may be provided in the hinge assembly 360. The FPCB 363 may be provided (e.g., disposed) in a direction (e.g., x-axis direction) transverse to the first support plate 361 and the second support plate 362. The FPCB 363 may be provided in a direction perpendicular to the folding axis A of the electronic device 301.

The first housing 310 and the second housing 320 may be assembled to be coupled at both sides of the hinge assembly 360 in a state in which the hinge assembly 360 is coupled to the display 330. For example, the first housing 310 and the second housing 320 may slide from both sides of the hinge assembly 360 and may couple to the hinge assembly 360. In an embodiment, the first housing 310 may include a first rotation support surface 314, and the second housing 320 may include a second rotation support surface 324 corresponding to the first rotation support surface 314. The first rotation support surface 314 and the second rotation support surface 324 may include a curved surface corresponding to the curved surface included in the hinge cover 365.

In an embodiment, when the electronic device 301 is in the unfolded state (e.g., the unfolded state of FIG. 3A), the first rotation support surface 314 and the second rotation support surface 324 may cover the hinge cover 365 such that the hinge cover 365 may not be exposed to the rear surface of the electronic device 301 or may have a minimum exposed area. In contrast, when the electronic device 301 is in the folded state (e.g., the folded state of FIG. 3B), the first rotation support surface 314 and the second rotation support surface 324 may rotate along the curved surface included in the hinge cover 365 such that the hinge cover 365 may have a maximum exposed area on the rear surface of the electronic device 301.

In an embodiment, the electronic device 301 may include a plurality of substrates 370. For example, the substrates 370 may include a first PCB 371, a second PCB 372, and a third PCB 373. The plurality of substrates 370, for example, the first PCB 371, the second PCB 372, and the third PCB 373, may be provided (e.g., disposed) in a space formed by the hinge assembly 360, the first housing 310, the second housing 320, the first rear cover 340, and the second rear cover 350. Electronic parts for implementing various functions of the electronic device 301 may be mounted to the first PCB 371, the second PCB 372, and the third PCB 373. In an embodiment, the first PCB 371 and the second PCB 372 may be provided in an opposite direction of the first area 331*a* based on the first support plate 361, and the third PCB 373 may be provided in an opposite direction of the second area 331*b* based on the second support plate 362. For example, the first PCB 371 and the second PCB 372 may be provided in the first housing 310, and the third PCB 373 may be provided in the second housing 320.

The FPCB 363 may serve to connect part elements provided (e.g., disposed) in the inner space of the device 301 that is formed by the first housing 310 and the second housing 320. For example, the FPCB 363 may connect the first PCB 371 and the second PCB 372 that are separate from each other. In another embodiment, the FPCB 363 may be provided in a direction (e.g., X-axis direction of FIG. 3C) transverse to the first support plate 361 and the second support plate 362 such that both sides extend to an inside of the first housing 310 and the second housing 320, respectively, and may electrically connect a substrate (e.g., the first PCB 371) provided to the first housing 310 and a substrate (e.g., the third PCB 373) provided to the second housing 320.

In an embodiment, a battery 380 may be provided (e.g., disposed) in the electronic device 301 and may supply power to the electronic device 301. In an embodiment, the battery 380 may be provided in the first housing 310 or the second housing 320. For example, the battery 380 may include a first battery 381 provided in the first housing 310 and a second battery 382 provided in the second housing 320. As another example, the battery 380 may be provided in only one of the first housing 310 and the second housing 320 or may be provided as a flexible battery to cross the first housing 310 and the second housing 320. In an embodiment, the battery 380 may be provided between the first PCB 371 and the second PCB 372 based on a state of viewing the display 330 in the unfolded state of the electronic device 301 as shown in FIG. 3A.

In an embodiment, an antenna module 390 may be provided (e.g., disposed) in the first housing 310 or the second housing 320. The antenna module 390 may include, for example, a near field communication (NFC) antenna, a wireless charging antenna, and/or a magnetic secure transmission (MST) antenna. The antenna module 390 may perform NFC with, for example, an external device or may wirelessly transmit and receive power required for charging.

In an embodiment, the antenna module 390 may be provided (e.g., disposed) to the first housing 310 or the second housing 320 such that at least a portion of the antenna module 390 may overlap the FPCB 363. For example, based on a state of viewing the display 330 in the unfolded state of the electronic device 301 as shown in FIG. 3A, the antenna module 390 may overlap the FPCB 363. In this case, the antenna module 390 and the battery 380 may partially overlap the FPCB 363.

Figure 4A:
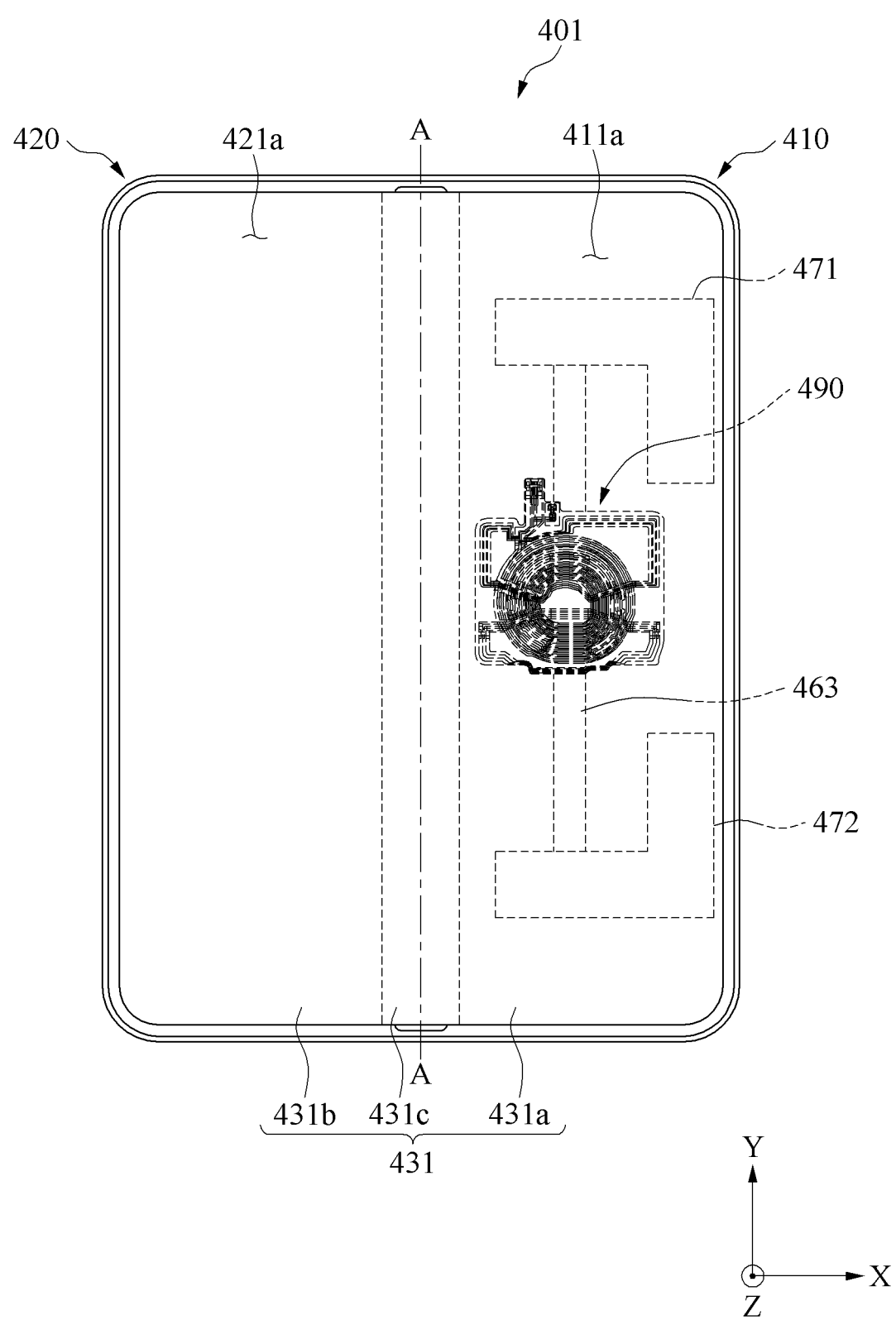
FIG. 4A illustrates an arrangement relationship between an antenna module and a flexible printed circuit board (FPCB) in an unfolded state of an electronic device according to embodiments.
Figure 4B:
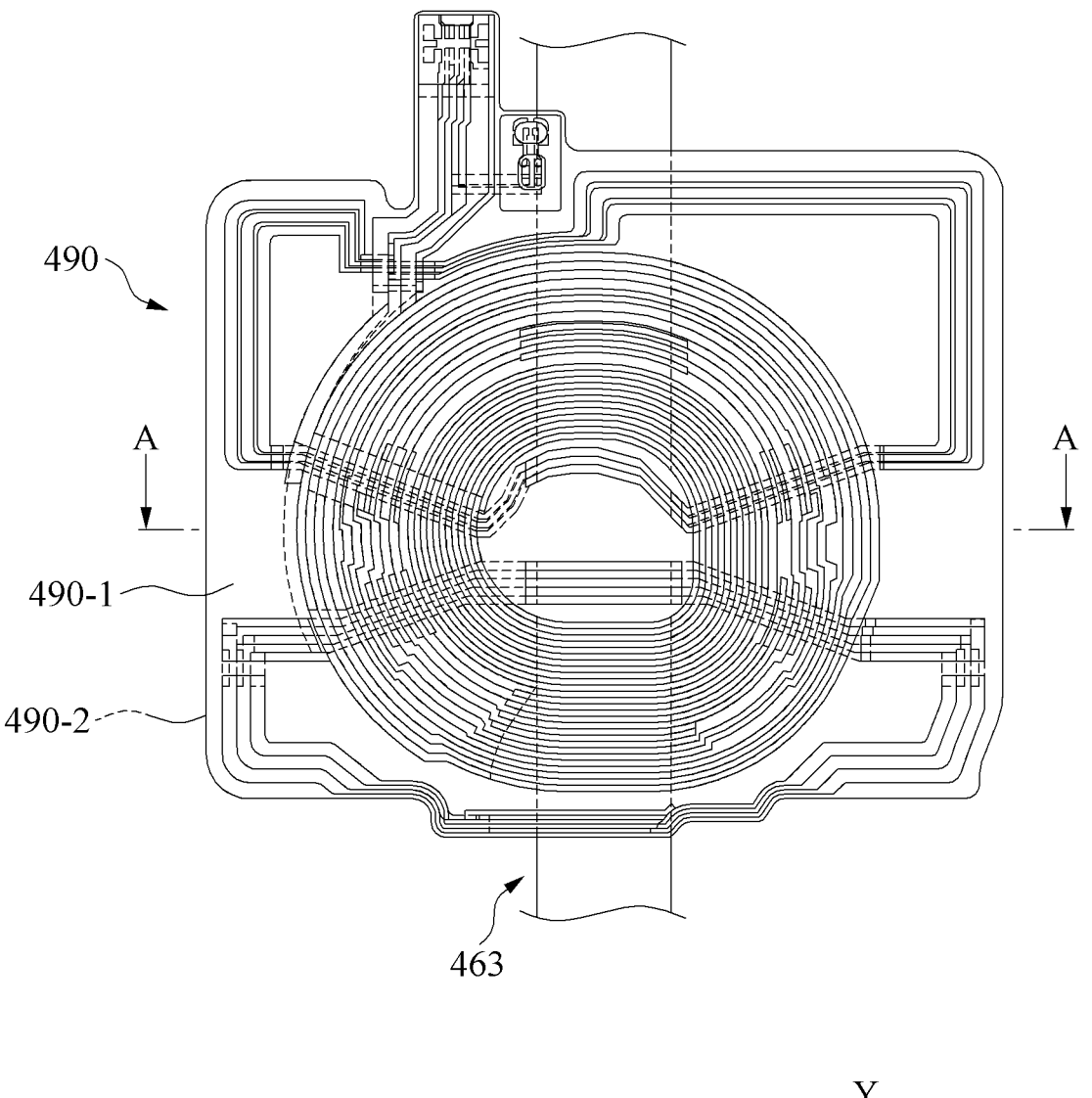
FIG. 4B illustrates an overlapping state of an antenna module and an FPCB according to embodiments.
Figure 4C:
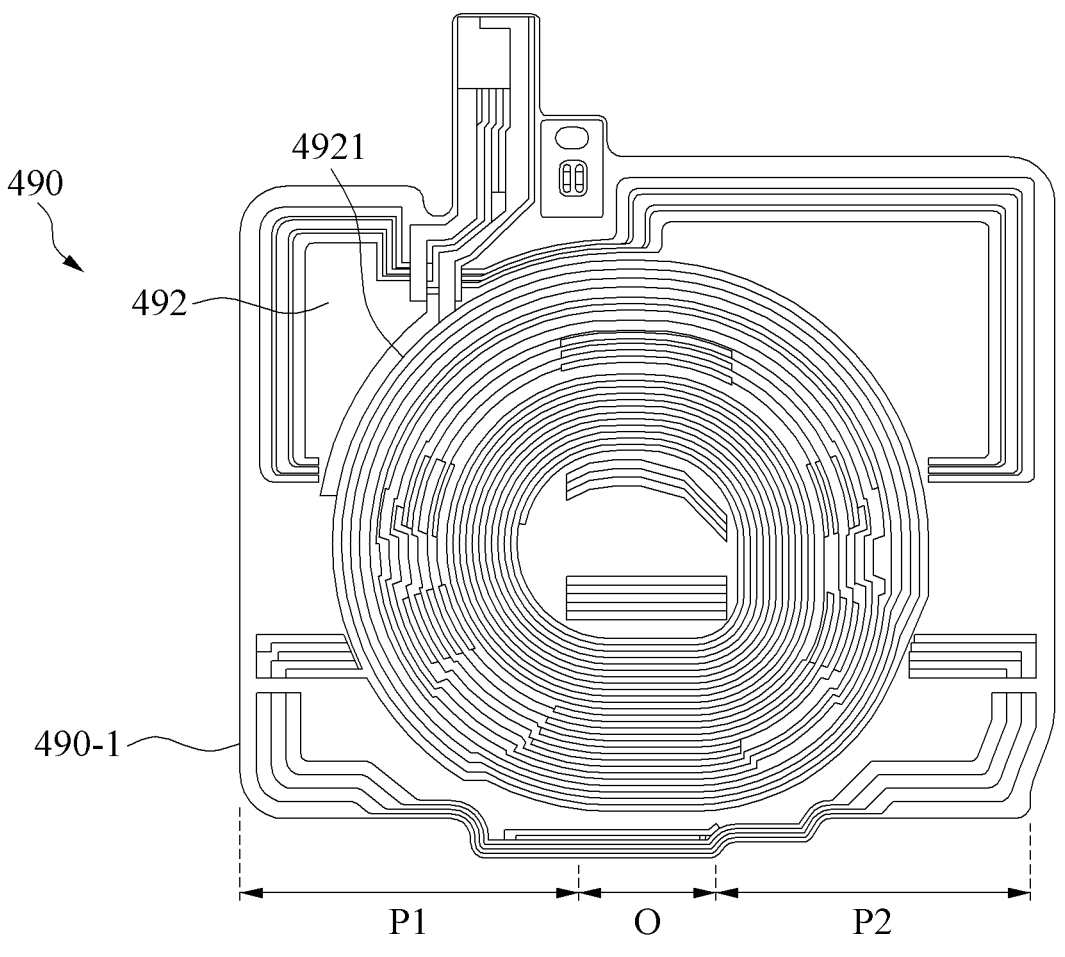
FIG. 4C illustrates a first pattern layer of an antenna module according to an embodiment.
Figure 4C:
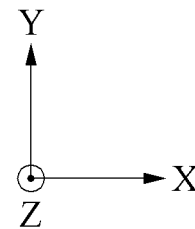
Figure 4D:
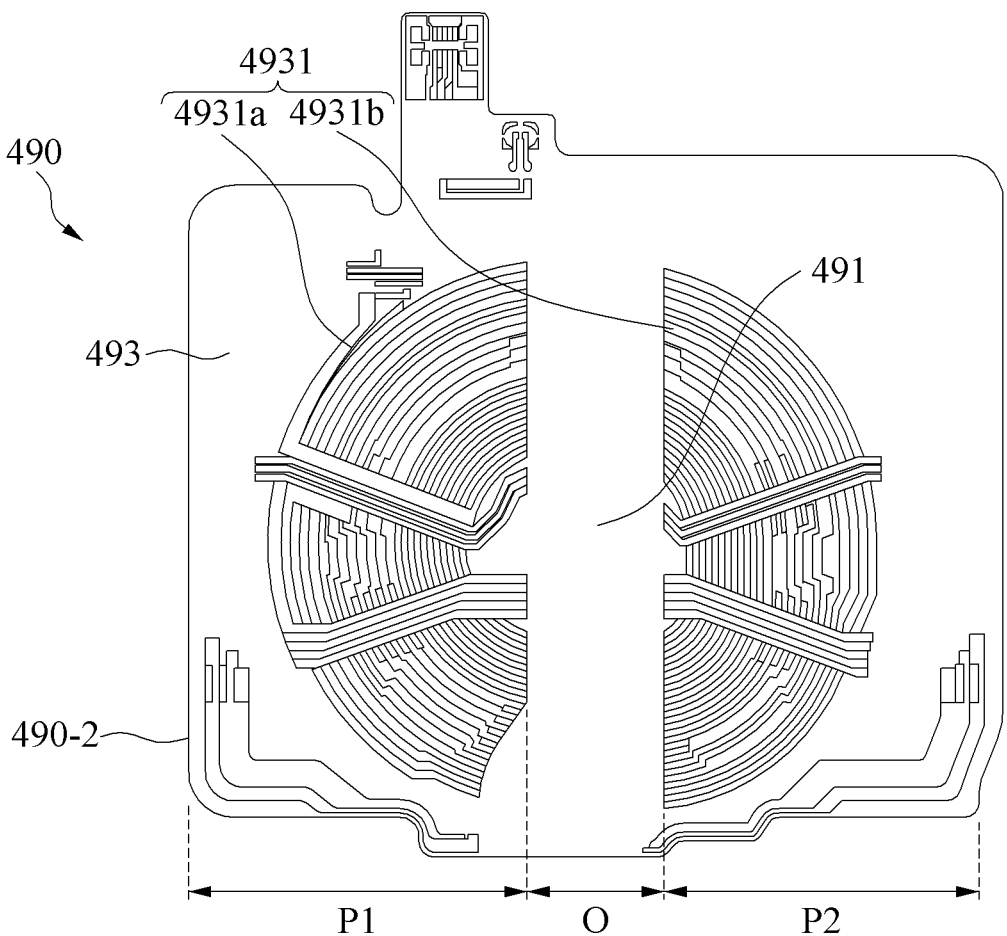
FIG. 4D illustrates a second pattern layer of an antenna module according to an embodiment.
Figure 5A:
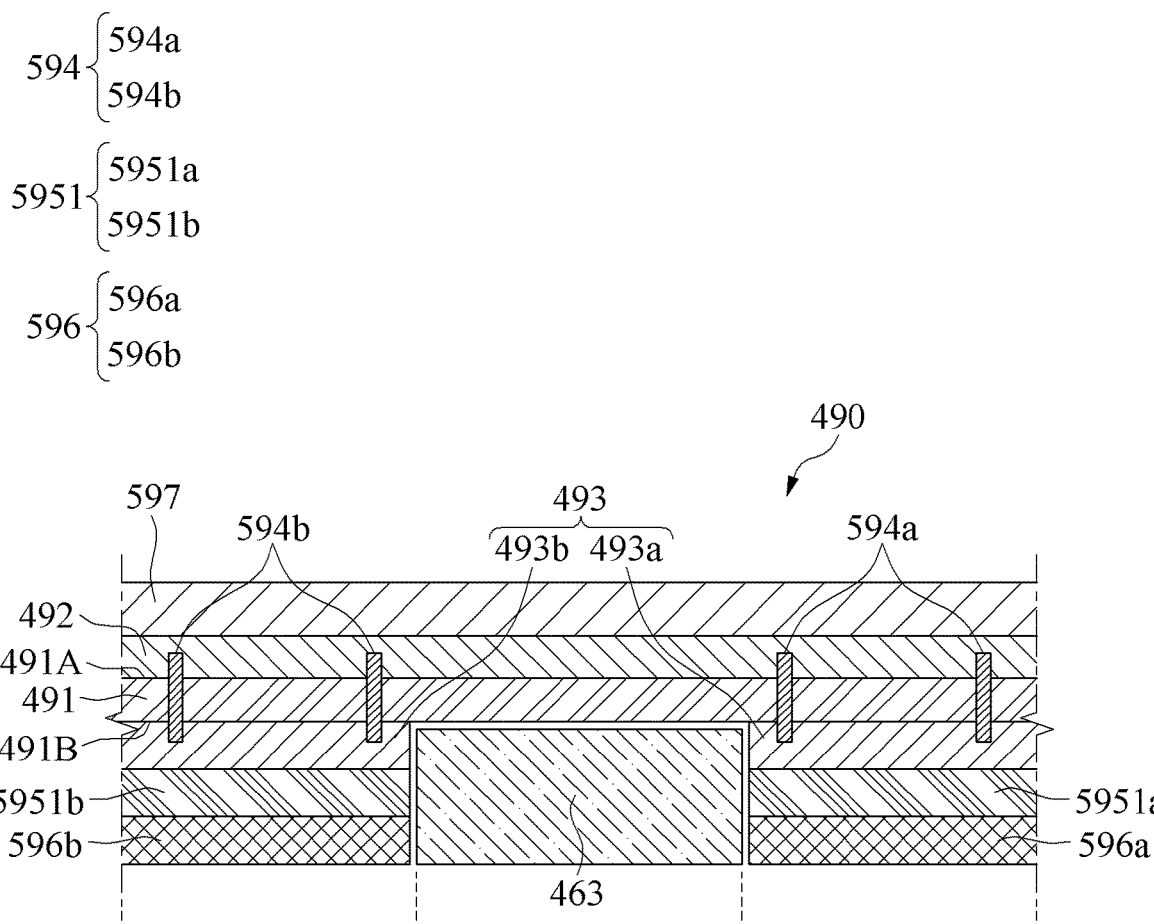
FIG. 5A is a cross-sectional view illustrating an antenna module cut along a line A-A of FIG. 4A.
Figure 5B:
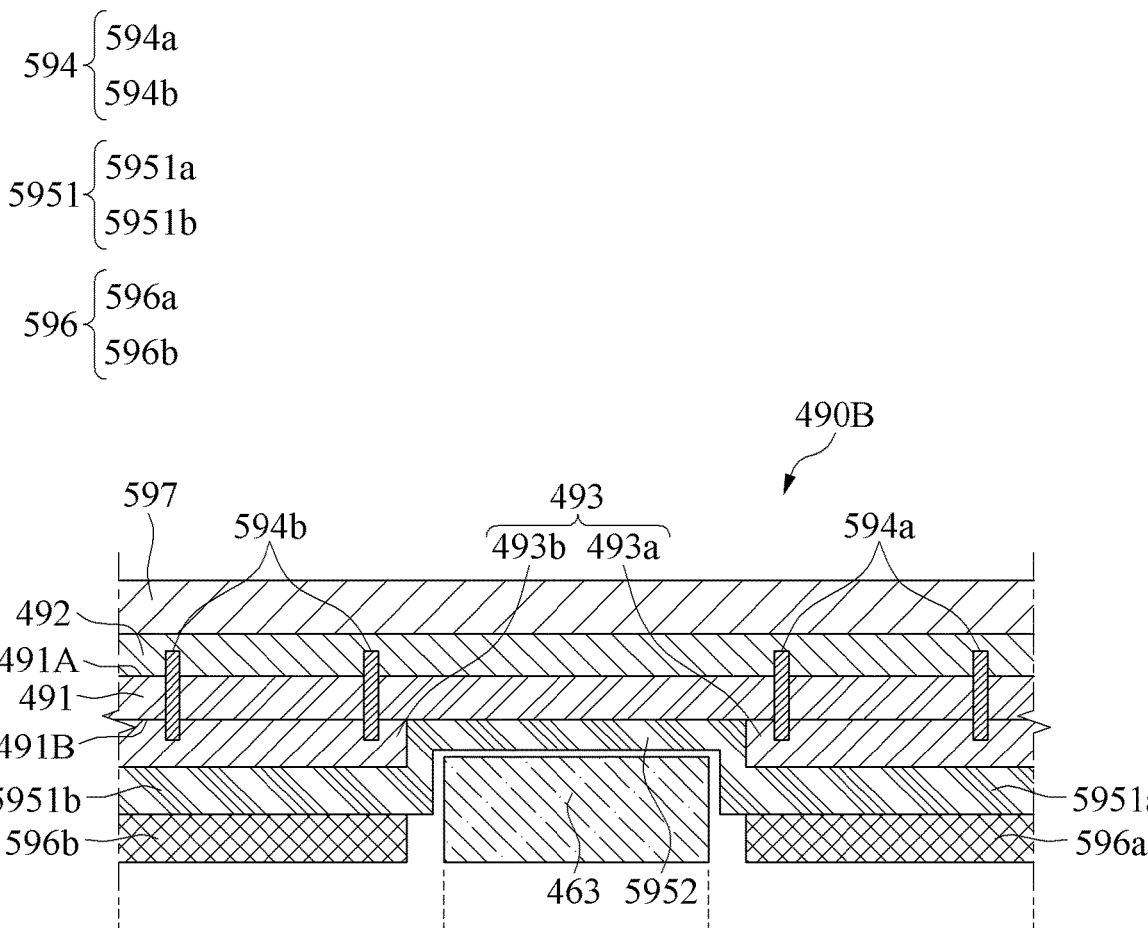
FIG. 5B is a cross-sectional view illustrating an antenna module cut along a line A-A of FIG. 4A.
Figure 5C:
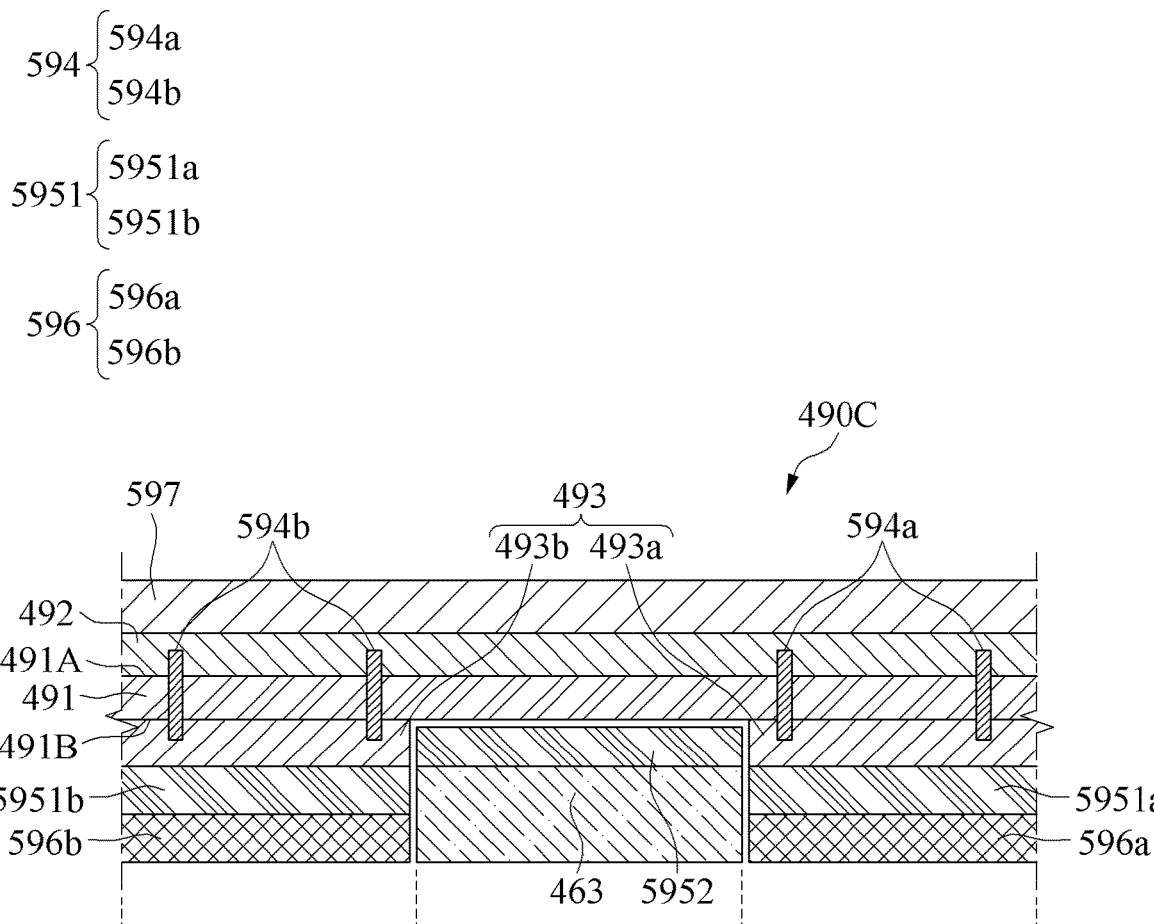
FIG. 5C is a cross-sectional view illustrating an antenna module cut along a line A-A of FIG. 4A.

FIG. 4A illustrates an arrangement relationship between an antenna module and an FPCB in an unfolded state of an electronic device according to embodiments, FIG. 4B illustrates an overlapping state of an antenna module and an FPCB according to an embodiment, FIG. 4C illustrates a first pattern layer of an antenna module according to an embodiment, FIG. 4D illustrates a second pattern layer of an antenna module according to an embodiment, FIG. 5A is a cross-sectional view illustrating an antenna module cut along a line A-A of FIG. 4A, FIG. 5B is a cross-sectional view illustrating an antenna module cut along a line A-A of FIG. 4A, and FIG. 5C is a cross-sectional view illustrating an antenna module cut along a line A-A of FIG. 4A.

Referring to FIGS. 4A to 4D and FIG. 5A, an electronic device 401 (e.g., the electronic device 101 of FIG. 1 or the electronic device 301 of FIG. 3A) according to an embodiment may include a display 431, a housing structure, for example, a first housing 410 and a second housing 420, a first PCB 471, a second PCB 472, an FPCB 463, (e.g., the FPCB 363 of FIG. 3C), and an antenna module 490 (e.g., the antenna module 390 of FIG. 3C).

In an embodiment, the housing structure may include the first housing 410 and the second housing 420. An inner space may be formed on the rear surface of the display 431 in such a manner that the first housing 410 and the display 431 form a first space 411*a* positioned on the rear surface of a first area 431*a* of the display 431, and the second housing 420 and the display 431 form a second space 421*a* positioned on the rear surface of a second area 431*b* of the display 431.

In an embodiment, the first PCB 471 and the second PCB 472 may be provided (e.g., disposed) in the inner space of the housing structure. For example, the first PCB 471 and the second PCB 472 may be provided to be separate from each other in the first space 411*a* as shown in FIG. 4A. In an embodiment, the FPCB 463 may connect the first PCB 471 and the second PCB 472. For example, the FPCB 463 may extend in a longitudinal direction such that both ends may connect to the first PCB 471 and the second PCB 472, respectively.

In an embodiment, the antenna module 490 may be provided (e.g., disposed) in the first space 411*a* or the second space 421*a*. For example, referring to FIG. 4A, the antenna module 490 may be provided in the first space 411*a* of the first housing 410. However, it is provided as an example only for clarity of description. For example, the antenna module 490 may be provided in the second space 421*a*, or a plurality of antenna modules 490 may be provided in the first space 411*a* and the second space 421*a*, respectively. In an embodiment, in a state of viewing the display 431 as shown in FIG. 4A, the antenna module 490 may be provided between the first PCB 471 and the second PCB 472. In this case, the antenna module 490 and the FPCB 463 may overlap each other. For example, in a state of viewing the display 431, the FPCB 463 may be provided in the housing structure to connect the first PCB 471 and the second PCB 472 across the antenna module 490.

In an embodiment, the antenna module 490 may be provided (e.g., disposed) between the display 431 and the FPCB 463. However, it is provided as an example only and the FPCB 463 may be provided between the display 431 and the antenna module 490. Hereinafter, for clarity of description, description is made based on an example in which the antenna module 490 is provided between the display 431 and the FPCB 463.

In an embodiment, the antenna module 490 may include a first antenna surface 490-1 and a second antenna surface 490-2 opposite to the first antenna surface 490-1 and configured to face the FPCB 463. In an embodiment, the antenna module 490 may include a base member 491, a first pattern layer 492, and a second pattern layer 493.

In an embodiment, the base member 491 may be formed in a plate shape. In an embodiment, the base member 491 may be formed as a substrate of a flexible material. For example, the base member 491 may include PI. The base member 491 may include a first substrate surface 491A and a second substrate surface 491B opposite to the first substrate surface 491A.

In an embodiment, the first pattern layer 492 and the second pattern layer 493 may be provided (e.g., disposed) on the first surface 491A and the second surface 491B of the base member 491, respectively. The second pattern layer 493 may include a first portion 493a provided in the first pattern area P1 and a second portion 493b provided in the second pattern area P2. The first pattern layer 492 may form a first coil pattern 4921 formed on the first surface 491A, and the second pattern layer 493 may form a second coil pattern 4931 formed on the second surface 491B. The first coil pattern 4921 and the second coil pattern 4931 may be formed of a conductive material, for example, Cu. In an embodiment, the first coil pattern 4921 and the second coil pattern 4931 may be electrically connected through the following via 594 and thereby may serve as a single connected coil antenna. In an embodiment, the first coil pattern 4921 and the second coil pattern 4931 may be interconnected and may serve as a wireless charging coil for wireless charging or an NFC coil for NFC with an external device.

In an embodiment, the antenna module 490 may include an overlapping area O in which the second pattern layer 493 is omitted in the second surface 491B of the base member 491 and a plurality of pattern areas in which the second coil patterns 4931 are separated through the overlapping area O. For example, referring to FIG. 4D, the antenna module 490 may include a first pattern area P1 and a second pattern area P2 that are separated by the overlapping area O. Although it is illustrated that the antenna module 490 includes two separate pattern areas P1 and P2 for clarity of description, it is provided as an example only for clarity of description. The antenna module 490 may include a plurality of pattern areas separate in various shapes according to a shape of the overlapping area O. For example, referring to FIG. 10C, the antenna module 1090 may include four pattern areas P1, P2, P3, and P4 separated through the overlapping area O in a cross shape. In an embodiment, second coil patterns 4931a and 4931b separate from another pattern area may be formed in the plurality of pattern areas P1 and P2, respectively.

In an embodiment, the antenna module 490 may include a plurality of vias 594 through which the first coil pattern 4921 and the second coil pattern 4931 are electrically connected. In an embodiment, the plurality of vias 594 may be formed in vial holes that pass through the base member 491. The plurality of vias 594 may be provided to the base member 491 to pass through the first surface 491A and the second surface 491B and may electrically connect the first coil pattern 4921 formed on the first surface 491A and the second coil pattern 4931 formed on the second surface 491B. In an embodiment, the plurality of vias 594 may be provided to the plurality of pattern areas P1 and P2, respectively. For example, referring to FIG. 5A, the antenna module 490 may include a first via 594a provided to the first pattern area P1 and a second via 594b provided to the second pattern area P2. In an embodiment, the plurality of vias 594 provided to the plurality of pattern areas P1 and P2 may electrically connect the second coil pattern 4931 formed in each of the pattern areas P1 and P2 to the first coil pattern 4921. For example, the first via 594a may electrically connect the second coil pattern 4931a formed in the first pattern area P1 to the first coil pattern 4921, and the second via 594b may electrically connect the second coil pattern 4931b formed in the second pattern area P2 to the first coil pattern 4921. In this case, the plurality of second coil patterns 4931a and 4931b formed in the plurality of pattern areas P1 and P2, respectively, may be electrically connected to the first coil pattern 4921 through the plurality of vias 594 and may serve as a single coil. Therefore, the first coil pattern 4921 and the plurality of second coil patterns 4931a and 4931b that are separate from each other may serve as a single coil through the plurality of vias 594.

In an embodiment, referring to FIG. 4A, in a state of viewing the display 431, the antenna module 490 may overlap the FPCB 463 through the overlapping area O. In an embodiment, the overlapping area O of the antenna module 490 may have a relatively thin thickness compared to that of the pattern area P1, P2 by omitting the second pattern layer 493. Therefore, the antenna module 490 may form a space in which the FPCB 463 is to be provided (e.g., disposed) on the second surface 491B corresponding to the overlapping area O. That is, the FPCB 463 may be provided in the electronic device 401 to connect the first PCB 471 and the second PCB 472 across the antenna module 490 through the overlapping area O. In this case, because the antenna module 490 is provided to overlap the FPCB 463 through the overlapping area O with the relatively thin thickness compared to that of the pattern area P1, P2, it is possible to decrease the thickness according to overlapping arrangement of the antenna module 490 and the FPCB 463 in the electronic device 401.

In an embodiment, in a state of viewing the second surface 491B, the overlapping area O may be formed to substantially cross the antenna module 490. In this case, the FPCB 463 may be overlappingly provided (e.g., disposed) to (i.e., may overlap) the antenna module 490 and cross the antenna module 490 through the overlapping area O. Therefore, a portion of the FPCB 463 that overlaps the antenna module 490 may be simplified, and for example may be in a linear form. According to the above structure, in the electronic device 401 according to an embodiment, it is possible to improve signal stability by reducing a connection length of the first PCB 471 and the second PCB 472 using FPCB 463 in a straight form and to improve internal space utilization of the electronic device 401 by reducing a thickness according to overlapping arrangement with the antenna module 490.

In an embodiment, the antenna module 490 may include a protective layer 597 stacked on the first surface 491A to cover the first pattern layer 492. The protective layer 597 may prevent the first coil pattern 4921 from being damaged by covering the surface of the first pattern layer 492. The protective layer 597 may be formed using a transparent material, for example, polyethylene terephthalate (PET).

In an embodiment, the antenna module 490 may include a first shielding layer 5951 stacked on the second surface 491B to cover the second pattern layer 493. In an embodiment, the first shielding layer 5951 may be stacked in each of the plurality of pattern areas P1 and P2. For example, when the antenna module 490 includes the first pattern area P1 and the second pattern area P2 that are separate based on the overlapping area O, first shielding layers 5951a and 5951b to cover the second pattern layer 493 of each pattern area may be provided to the first pattern area P1 and the second pattern area P2, respectively. In this case, the first shielding layer 5951a formed in the first pattern area P1 and the first shielding layer 5951b formed in the second pattern area P2 may be separate from each other. In an embodiment, the first shielding layers 5951a and 5951b formed in the pattern areas P1 and P2, respectively, may have the same thickness or may have different thicknesses. In an embodiment, the first shielding layer 5951 may include a material capable of blocking an electromagnetic wave occurring in the antenna module 490. For example, the first shielding layer 5951 may include a material capable of blocking an electromagnetic wave of a set frequency band. In an embodiment, the first shielding layer 5951 may be formed as a single layer as shown in FIG. 5A. However, embodiments are not limited thereto and the first shielding layer 5951 may include a plurality of layers.

In an embodiment, the antenna module 490 may include a heat dissipation layer 596 stacked in the pattern area to cover the first shielding layer 5951. In an embodiment, the heat dissipation layer 596 may cover the second surface 491B of the antenna module 490. In an embodiment, the heat dissipation layer 596 may radiate heat generated in the antenna module 490, for example, heat generated due to heating of the first coil pattern 4921 and the second coil pattern 4931 to an outside of the antenna module 490. In an embodiment, the heat dissipation layer 596 may include a material having high heat dissipation performance, for example, a graphite material and may be provided in a form of a heat dissipation plate that includes a heat sink or a heat pipe. In an embodiment, the heat dissipation layer 596 may be provided (e.g., disposed) in each of the plurality of pattern areas. For example, when the antenna module 490 includes the first pattern area P1 and the second pattern area P2 that are separate from each other, the heat dissipation layer 596 may include a first heat dissipation layer 596*a* provided in the first pattern area P1 and a second heat dissipation layer 596*b* provided in the second pattern area P2. In this case, the first heat dissipation layer 596*a* and the second heat dissipation layer 596*b* may be separate from each other.

In an embodiment, the antenna module 490 may expose the second surface 491B of the base member 491 to decrease the thickness of the overlapping area O. For example, referring to FIG. 5A, the first shielding layer 5951 and the heat dissipation layer 596 may be omitted from the second surface 491B corresponding to the overlapping area O. In this case, the antenna module 490 may form a space in which the FPCB 463 may be overlappingly provided (e.g., disposed) through the overlapping area O. For example, referring to FIG. 5A, the FPCB 463 may be provided (e.g., disposed) within the overlapping area O in a space between the first pattern area P1 and the second pattern area P2 of the antenna module 490. In this case, in a state in which the FPCB 463 is provided in the overlapping area O, the surface of the pattern area of the antenna module 490 may have a height substantially equal to or greater than that of the second surface 491B. Therefore, in a state in which the FPCB 463 is overlappingly provided in the overlapping area O of the antenna module 490, the FPCB 463 may overlap the antenna module 490 without increasing the thickness of the antenna module 490. In an embodiment, in a state in which the FPCB 463 is provided in the overlapping area O, the antenna module 490 may be formed such that a width of the overlapping area O is substantially equal to or greater than that of a portion of the FPCB 463 provided in the overlapping area O. In this case, the FPCB 463 may be stably provided in a space formed by the overlapping area O of the antenna module 490.

Referring to FIGS. 5B and 5C, the antenna module 490B, 490C according to embodiments may include the base member 491, the first pattern layer 492 provided (e.g., disposed) on the first surface 491A of the base member 491, the second pattern layer 493 and the plurality of vias 594 provided to the second surface 491B of the base member 491, the protective layer 597, the first shielding layer 5951, a second shielding layer 5952, and the heat dissipation layer 596.

In an embodiment, the antenna module 490B, 490C may include the overlapping area O in which the second pattern layer 493 is omitted and the FPCB 463 is provided (e.g., disposed), and the first pattern area P1 and the second pattern area P2 each in which the second pattern layer 493 is formed based on the overlapping area O.

In an embodiment, the first shielding layer 5951 may be stacked on the second surface 491B to cover the second pattern layer 493. In an embodiment, the first shielding layer 5951 may be provided in each of the plurality of pattern areas P1 and P2 (e.g., the first pattern area P1 and the second pattern area P2 of FIG. 5B). In an embodiment, the first shielding layer 5951 may be formed of a material capable of blocking an electromagnetic wave generated in the antenna module 490B, 490C.

In an embodiment, the second shielding layer 5952 may be provided (e.g., disposed) in the overlapping area O and stacked to cover the second surface 491B of the base member 491. In this case, in a state in which the FPCB 463 is provided in the overlapping area O, the second shielding layer 5952 may prevent direct contact between the base member 491 and the FPCB 463. In an embodiment, the second shielding layer 5952 may be formed of the same material as that of the first shielding layer 5951. In this case, referring to FIG. 5B, the second shielding layer 5952 provided in the overlapping area O and the shielding layer 5951 formed in each of the plurality of pattern areas P1 and P2 may be integrally connected and may form a single shielding layer.

In an embodiment, the first shielding layer 5951 and the second shielding layer 5952 may be formed to have different thicknesses. For example, the second shielding layer 5952 may be formed to have a relatively thin thickness compared to that of the first shielding layer 5951 to minimize the thickness of the antenna module 490B, 490C corresponding to the overlapping area O. Therefore, in a state in which the FPCB 463 is positioned in the overlapping area O, the overlapping thickness of the antenna module 490B, 490C and the FPCB 463 may be minimized.

According to another embodiment, referring to FIG. 5C, in the antenna module 490C, the first shielding layer 5951 and the second shielding layer 5952 may be separately formed and may be provided (e.g., disposed) in the pattern area P1, P2 and the overlapping area O, respectively.

Figures 6A, 6B:
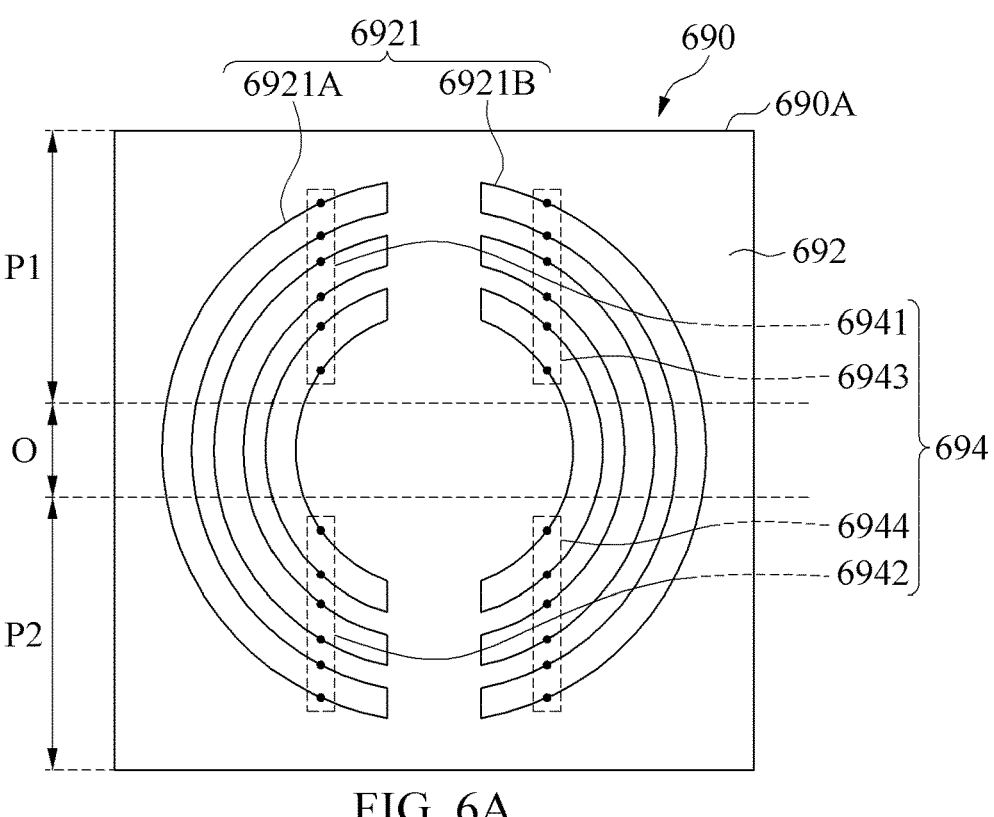
FIG. 6A and FIG. 6B illustrate a first pattern layer and a second pattern layer of an antenna module according to an embodiment.
Figure 6C:
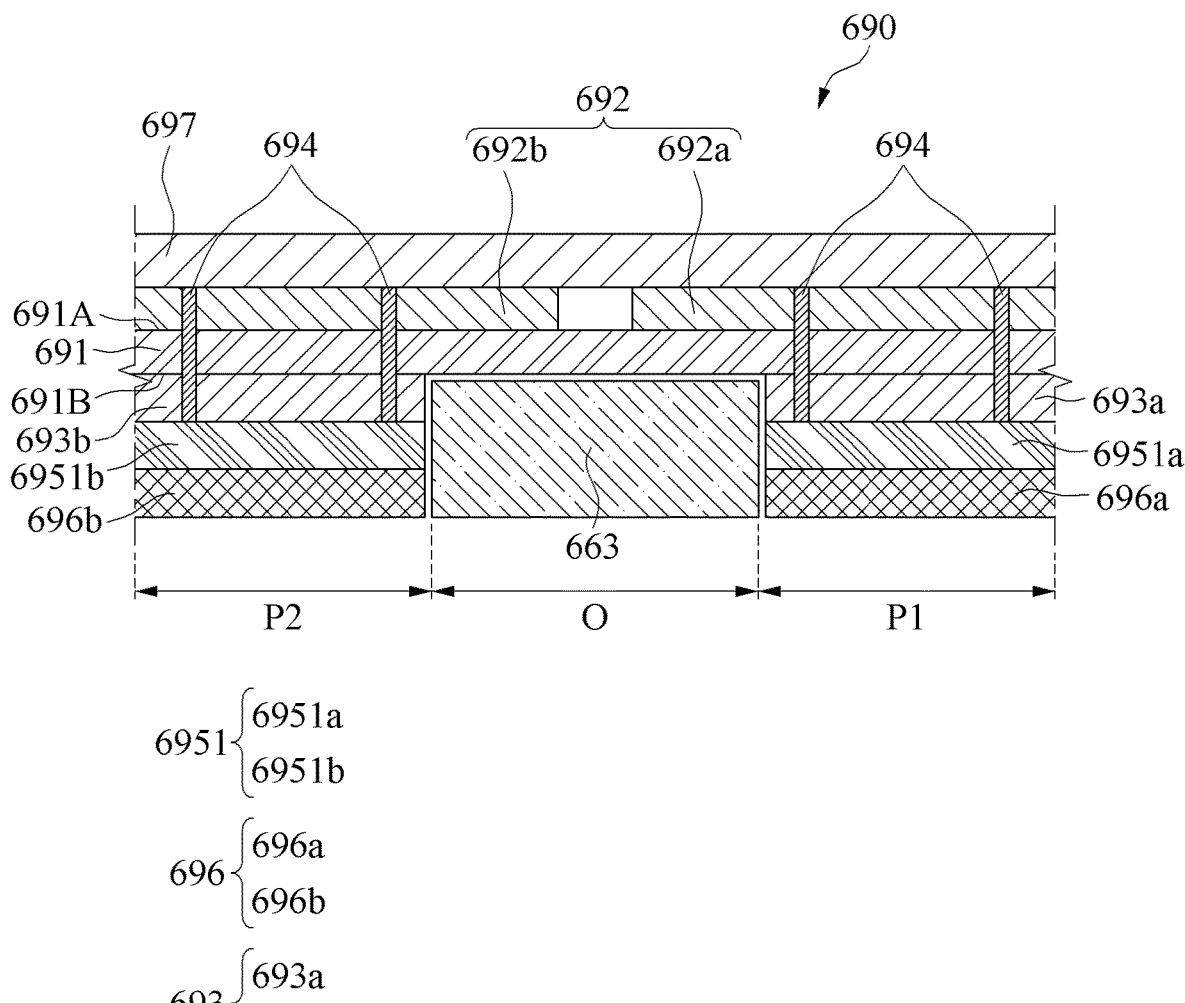
FIG. 6C is a cross-sectional view of an antenna module cut along a line B-B of FIG. 6B.

FIG. 6A and FIG. 6B illustrate a first pattern layer and a second pattern layer of an antenna module according to an embodiment, and FIG. 6C is a cross-sectional view of an antenna module cut along a line B-B of FIG. 6B.

For reference, FIG. 6A illustrates a first antenna surface of an antenna module 690 and FIG. 6B illustrates a second antenna surface of the antenna module 690 opposite to the first antenna surface.

Referring to FIGS. 6A, 6B and 6C, the antenna module 690 may include a base member 691, a first pattern layer 692 provided (e.g., disposed) on a first surface 691A of the base member 691, a second pattern layer 693 and a plurality of vias 694 provided to the second surface 691B of the base member 691, a protective layer 697, a first shielding layer 6951, and a heat dissipation layer 696. The first pattern layer 692 may include a first portion 692*a* provided in the first pattern area P1 and a second portion 692*b* provided in the second pattern area P2. The second pattern layer 693 may include a first portion 693*a* provided in the first pattern area P1 and a second portion 693*b* provided in the second pattern area P2. The heat dissipation layer 696 may include a first portion 696*a* provided in the first pattern area P1 and a second portion 696*b* provided in the second pattern area P2. The first shielding layer 6951 may include a first portion 6951*a* provided in the first pattern area P1 and a second portion 6951*b* provided in the second pattern area P2.

In an embodiment, the first pattern layer 692 may form a first coil pattern 6921 formed on the first surface 691A. In an embodiment, the first pattern layer 692 may include a plurality of first coil patterns 6921 that are separate from each other. For example, referring to FIG. 6A, the first coil pattern 6921 may include a first separation pattern 6921A and a second separation pattern 6921B that are separate from each other.

In an embodiment, the second pattern layer 693 may be provided (e.g., disposed) on the second surface 691B. In this case, referring to FIG. 6B, the second pattern layer 693 may be provided on each of the plurality of pattern areas P1 and P2 omitted in the overlapping area O and separate from each other based on the overlapping area O. The second pattern layer 693 may form the plurality of second coil patterns 6931 separate from each other in each pattern area P1, P2. For example, the second coil patterns 6931A and 6931B may be formed in the first pattern area P1 and the second pattern area P2, respectively.

In an embodiment, in a state of viewing the first antenna surface (e.g., FIG. 6A) of the antenna module 690, the first coil patterns 6921A and 6921B separate from each other may be formed at positions at which the first coil patterns 6921A and 6921B at least partially overlap the plurality of second coil patterns 6931A and 6931B formed in the second pattern layer 693, respectively. For example, each of the first separation pattern 6921A and the second separation pattern 6921B may be formed to continue from the first pattern area P1 to the second pattern area P2.

In an embodiment, the plurality of vias 694 may electrically connect the first coil pattern 6921 and the second coil pattern 6931. For example, the plurality of vias 694 may include a first via 6941 provided in the first pattern area P1 and configured to connect the first separation pattern 6921A and the second coil pattern 6931A formed in the first pattern area P1, a second via 6942 provided in the second pattern area P2 and configured to connect the first separation pattern 6921A and the second coil pattern 6931B formed in the second pattern area P2, a third via 6943 provided in the first pattern area P1 and configured to connect the second separation pattern 6921B and the second coil pattern 6931A formed in the first pattern area P1, and a fourth via 6944 provided in the second pattern area P2 and configured to connect the second separation pattern 6921B and the second coil pattern 6931B provided in the second pattern area P2. In this case, the plurality of first coil patterns 6921 and the plurality of second coil patterns 6931 separate from each other may be electrically connected through the plurality of vias 694 and may serve as a single antenna coil.

Figure 7A:
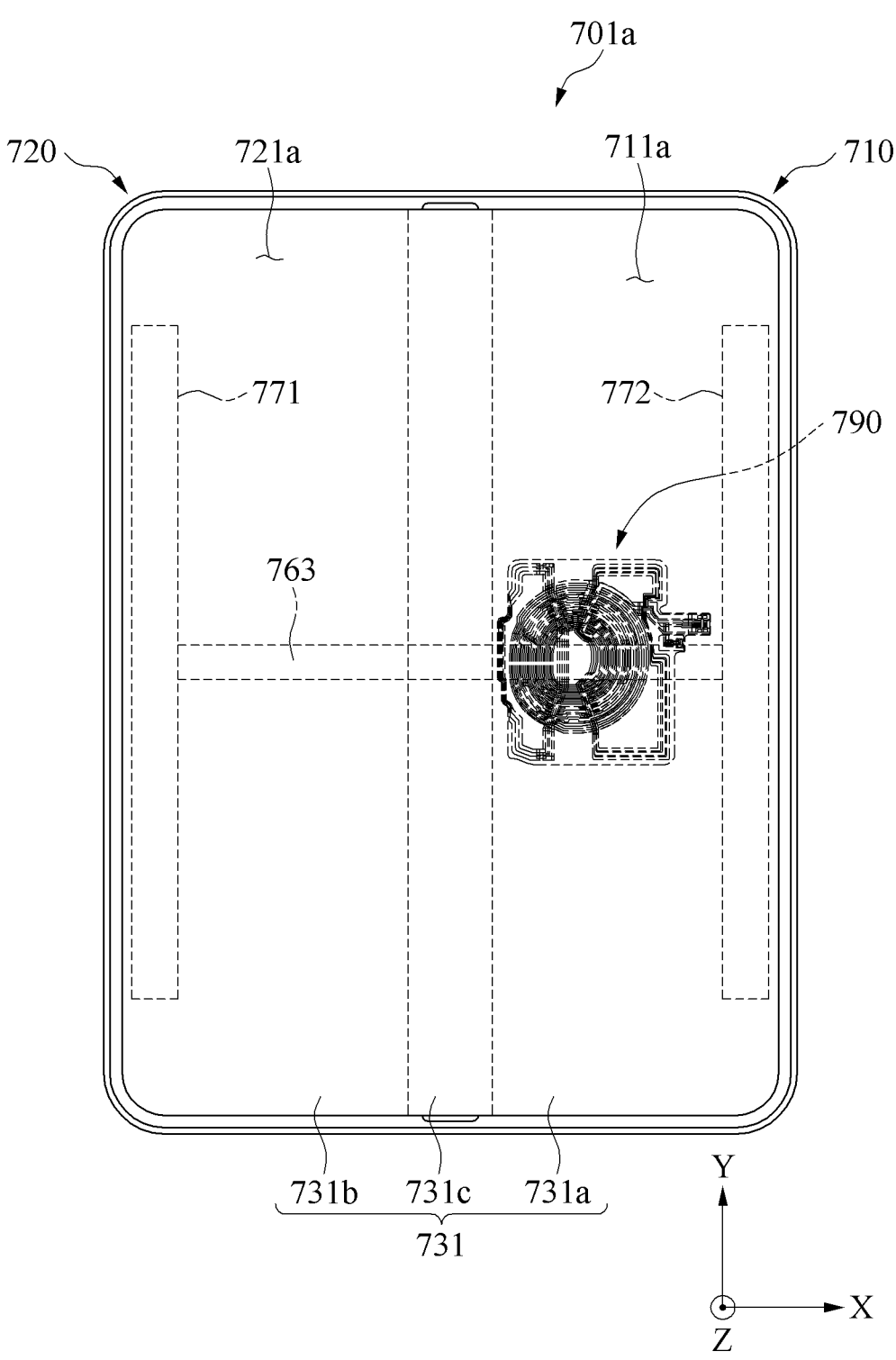
FIGS. 7A and 7B illustrate an example of an arrangement state of an antenna module and an FPCB in an unfolded state of an electronic device according to an embodiment.
Figure 7B:
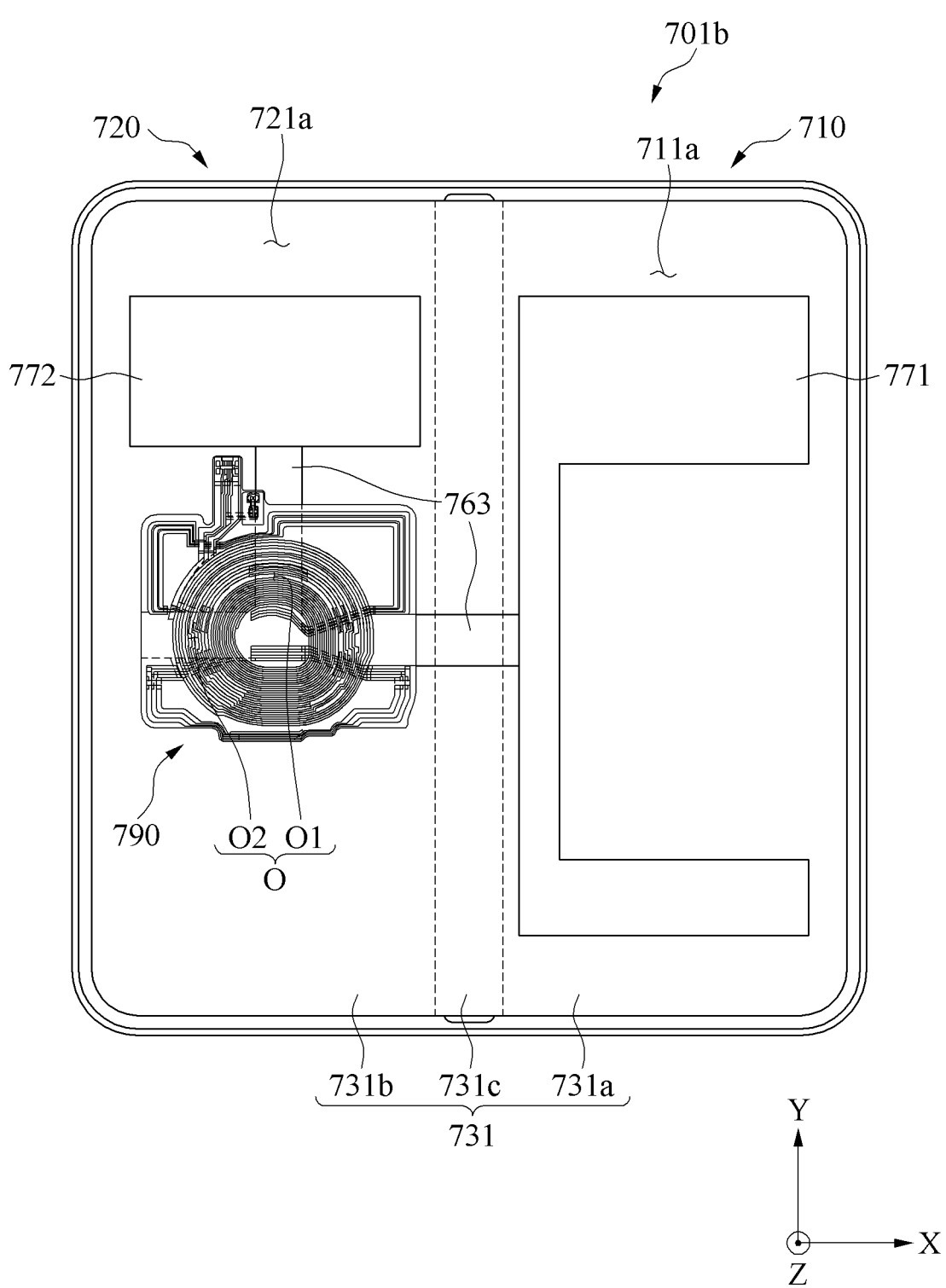

FIGS. 7A and 7B each illustrates an example of an arrangement state of an antenna module and an FPCB in an unfolded state of an electronic device according to an embodiment.

Referring to FIGS. 7A and 7B, an electronic device 701a, 701b (e.g., the electronic device 101 of FIG. 1, the electronic device 301 of FIG. 3A) according to an embodiment may include a display 731, a first housing 710, a second housing 720, a first PCB 771, a second PCB 772, an FPCB 763 (e.g., the FPCB 363 of FIG. 3C), and an antenna module 790 (e.g., the antenna module 297 of FIG. 2 or the antenna module 390 of FIG. 3C).

In an embodiment, the display 731 may include a first area 731a, a second area 731b, and a folding area 731c configured to connect the first area 731a and the second area 731b. In an embodiment, the first housing 710 may form a first space 711a positioned on the rear surface of the first area 731a and the second housing 720 may form a second space

721a positioned on the rear surface of the second area 731b. In an embodiment, the first PCB 771 and the second PCB 772 may be selectively provided to the first area 731a or the second area 731b according to a part arrangement structure in an inner space of the electronic device 701a, 701b.

In an embodiment, both ends of the FPCB 763 may be connected to the first PCB 771 and the second PCB 772. In an embodiment, the FPCB 763 may be formed to be capable of effectively delivering a signal according to arrangement positions and shapes of the first PCB 771 and the second PCB 772 and positions of connectors mounted thereto. For example, referring to FIG. 7A, when the first PCB 771 and the second PCB 772 are symmetrically provided in the first space 711a and the second space 721b, respectively, the FPCB 763 may extend to the first area 731a and the second area 731b across the folding area 731c and both ends of the FPCB 763 may be connected to the first PCB 771 and the second PCB 772. In this case, the FPCB 763 may be formed in a linearly extending form to connect the first PCB 771 and the second PCB 772 at a shortest distance. In contrast, referring to FIG. 7B, when the first PCB 771 and the second PCB 772 are asymmetrically provided in the electronic device 701b, at least a portion of the FPCB 763 may be formed in a vertically bent shape to connect connectors of the first PCB 771 and the second PCB 772 at a shortest distance and the FPCB 763 may be provided in the electronic device 701.

In an embodiment, the antenna module 790 may be provided (e.g., disposed) in the electronic device 701, for example, the first housing 710 or the second housing 720. In this case, the antenna module 790 may be provided at a position at which at least a portion thereof overlaps the FPCB 763 based on a state of viewing the display 731. For example, the antenna module 790 may be provided in the first housing 710 as shown in FIG. 7A or may be provided in the second housing 720 as shown in FIG. 7B, to overlap the FPCB 763 through the overlapping area O. In an embodiment, to minimize an overlapping thickness with the FPCB 763, the antenna module 790 may be formed such that a second surface (e.g., the second surface 491B of FIG. 5A) may be exposed in the overlapping area O. For example, in the antenna module 790, a second pattern layer (e.g., the second pattern layer 493 of FIG. 5A) for forming a second coil pattern, a first shielding layer (e.g., the first shielding layer 5951 of FIG. 5A), or a heat dissipation layer (e.g., the heat dissipation layer 596 of FIG. 5A) is omitted in the overlapping area O, it is possible to decrease a thickness according to an overlapping arrangement with the FPCB 763.

In an embodiment, in the antenna module 790, a shape of the overlapping area O may be designed according to a relative arrangement position with the FPCB 763 in the electronic device 701. For example, referring to FIG. 7B, when the antenna module 790 is provided (e.g., disposed) in the electronic device 701 to overlap the bent portion of the FPCB 763, the overlapping area O may include a first overlapping area O1 having a first longitudinal direction and a second overlapping area O2 connected to the first overlapping area O1 and having a second longitudinal direction with a constant angle relative to the first longitudinal direction. In this case, at least a portion of the FPCB 763 overlappingly provided to the antenna module 790 may be provided in the first overlapping area O1 and the second overlapping area O2. Although it is illustrated that the overlapping area O is divided into the first overlapping area O1 and the second overlapping area O2 that are vertically connected to each other, it is provided as an example only for clarity of description. The shape of the overlapping area O in the antenna module 790 is not limited thereto. For example, the overlapping area O in the antenna module 490 may be formed in a substantially straight shape as shown in FIG. 4A or may be formed in a shape bent at a predetermined angle as shown in FIG. 12C. According to the above structure, the antenna module 790 may improve internal space utilization of the electronic device 701 by minimizing a thickness according to overlapping with the FPCB 763 without limiting an arrangement position and shape of the FPCB 763 in the electronic device 701.

Figure 8A:
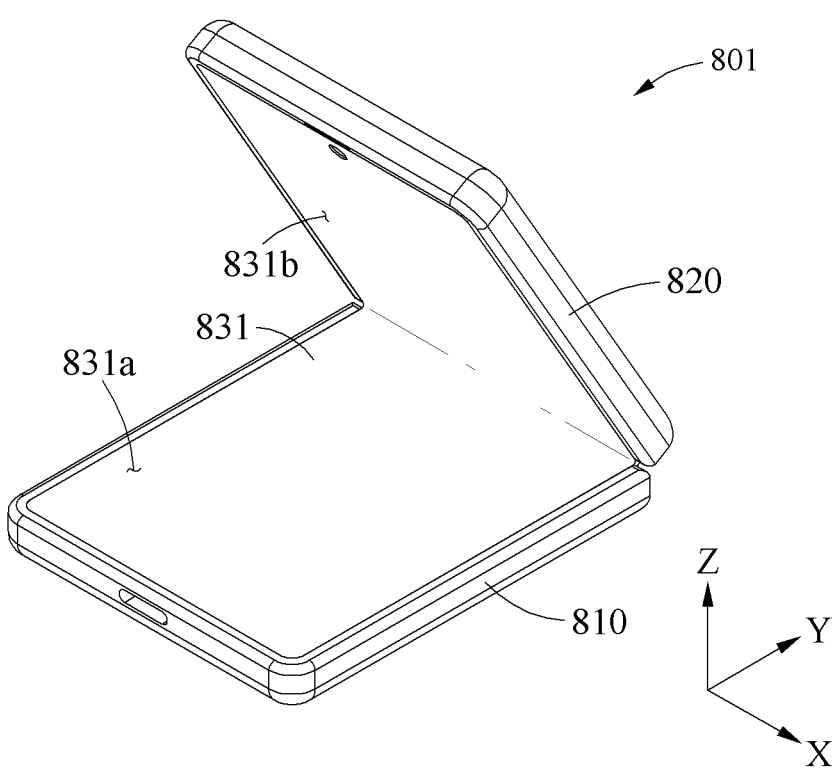
FIGS. 8A and 8B illustrate an operating state of an electronic device according to embodiments.
Figure 8B:
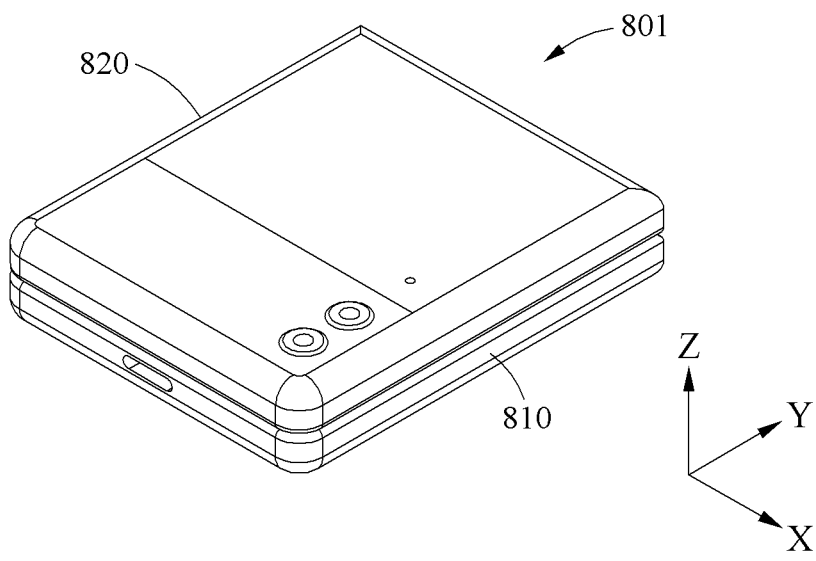
Figure 9A:
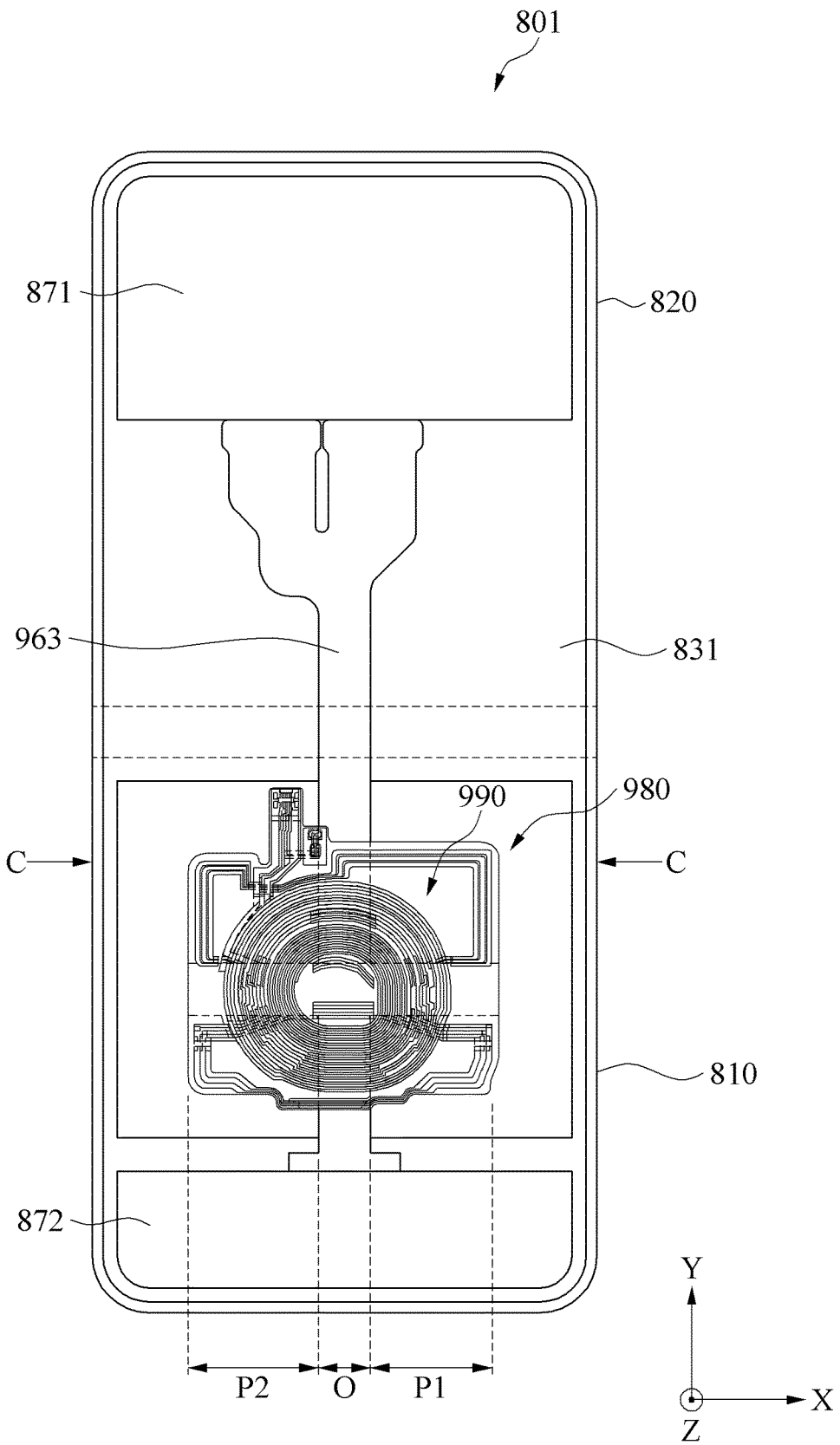
FIG. 9A illustrates an example of an arrangement state of an antenna module, an FPCB, and a battery in an unfolded state of an electronic device according to an embodiments.
Figure 9B:
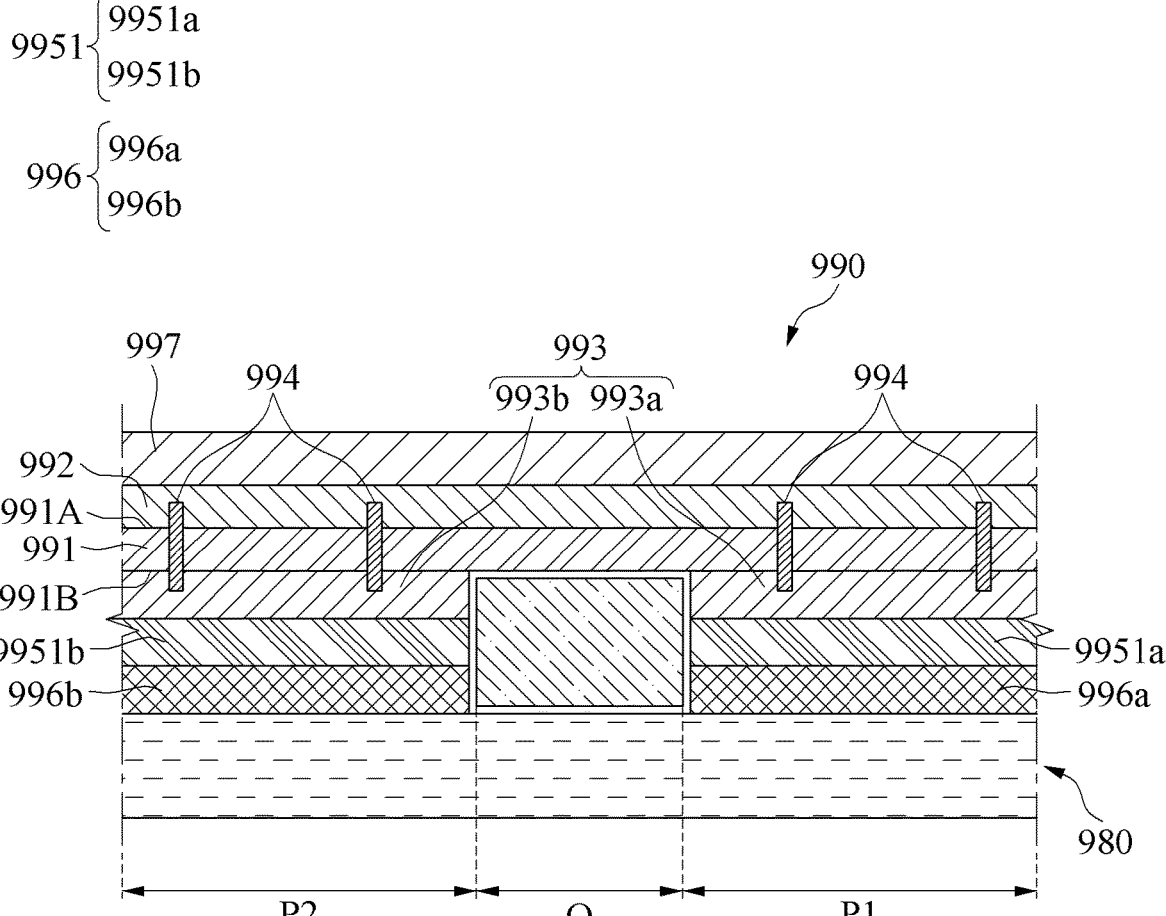
FIG. 9B is a cross-sectional view illustrating an antenna module cut along a line C-C of FIG. 9A.

FIGS. 8A and 8B illustrate an operating state of an electronic device according to embodiments, FIG. 9A illustrates an example of an arrangement state of an antenna module, an FPCB, and a battery in an unfolded state of an electronic device according to an embodiment, and FIG. 9B is a cross-sectional view illustrating an antenna module cut along a line C-C of FIG. 9A.

Referring to FIGS. 8A, 8B, 9A, and 9B, an electronic device 801 according to an embodiment may include a display 831 including a first area 831a and a second area 831b, a first housing 810 configured to support the first area 831a, a second housing 820 configured to support the second area 831b, a first PCB 871, a second PCB 872, an FPCB 963, an antenna module 990, and a battery 980.

An operating state of the electronic device 801 according to an embodiment may vary according to relative positions of the first housing 810 and the second housing 820. For example, the operating state of the electronic device 801 may be shifted among a first state (e.g., a fully unfolded state of FIG. 9A) in which the first area 831a and the second area 831b of the display 831 are substantially coplanar, a second state (e.g., a completely closed state of FIG. 8B) in which the first area 831a and the second area 831b are provided to face each other and are not visually exposed to the outside, and an intermediate state (e.g., an incompletely closed state of FIG. 8A) in which the first area 831a and the second area 831b form a predetermined angle and are exposed to the outside.

In an embodiment, one or more PCBs 871 and 872 in which a plurality of circuit elements is mounted may be provided in the electronic device 801. In this case, the PCBs 871 and 872 may be provided at various positions in the first housing 810 or the second housing 820 according to an internal part arrangement design of the electronic device 801. For example, referring to FIG. 9A, the electronic device 801 may include the first PCB 871 provided in the first housing 810 and the second PCB 872 provided in the second housing 820. In an embodiment, the electronic device 801 may include the FPCB 963 electrically connected to the plurality of PCBs 871 and 872 and configured to deliver a signal therebetween. For example, the FPCB 963 may be provided (e.g., disposed) to cross the first housing 810 and the second housing 820 and both ends of the FPCB 963 may be connected to the first PCB 871 and the second PCB 872, respectively. In an embodiment, the FPCB 963 may be formed to be capable of effectively delivering a signal between the plurality of PCBs 871 and 872. For example, referring to FIG. 9A, the FPCB 963 may be formed in a straight form capable of connecting the first PCB 871 and the second PCB 872 at a shortest distance.

In an embodiment, the antenna module 990 may be provided (e.g., disposed) in the first housing 810 or the second housing 820 between the first PCB 871 and the second PCB 872. In this case, referring to FIG. 9A, in a state of viewing the display 831, the antenna module 990 may be provided such that at least a portion thereof may overlap the FPCB 963. In an embodiment, the antenna module 990 may include an overlapping area O that overlaps the FPCB 963 and a first pattern area P1 and a second pattern area P2 that are separate from each other based on the overlapping area O. In this case, the overlapping area O of the antenna module 990 may be formed to have a relatively thin thickness compared to that of the first pattern area P1 and the second pattern area P2, and at least a portion of the FPCB 963 may be provided in a space between the first pattern area P1 and the second pattern area P2 through the overlapping area O. Therefore, the antenna module 990 and the FPCB 963 may reduce the thickness according to overlapping in a state in which the antenna module 990 and the FPCB 963 are overlappingly provided in the electronic device 801. In an embodiment, the overlapping area O of the antenna module 990 may be formed in a shape corresponding to a shape of the FPCB 963 or an arrangement position of the FPCB 963 in the electronic device 801. Therefore, the antenna module 990 may be overlappingly provided to the FPCB 963 through the overlapping area O without increasing a thickness of the antenna module 990 in the overlapping area O to avoid an excessively occupied space in the electronic device 801, and without limiting the shape or the arrangement position of the FPCB 963.

In an embodiment, referring to FIG. 9A, the battery 980 may be overlappingly provided (e.g., disposed) to the antenna module 990 at a state of viewing the display 831. In this case, the FPCB 963 may be provided between the antenna module 990 and the battery 980.

In an embodiment, the antenna module 990 may include a base member 991, a first pattern layer 992, a second pattern layer 993, a plurality of vias 994 electrically connecting the first pattern layer 992 and the second pattern layer 993, a first shielding layer 9951 provided (e.g., disposed) to the pattern areas P1 and P2 to cover the first pattern layer 992, and a heat dissipation layer 996 provided to the pattern areas P1 and P2 to cover the first shielding layer 9951. In an embodiment, second pattern layers 993a and 993c that are separate from each other, first shielding layers 9951a and 9951b that are separate from each other and heat dissipation layers 996a and 996b that are separate from each other may be stacked in the first pattern area P1 and the second pattern area P2, respectively.

In an embodiment, the base member 991 may include a first surface 991A and a second surface 991B opposite to the first surface 991A and configured to face the FPCB 963. The first pattern layer 992 may be provided (e.g., disposed) to the first surface 991A to form a first coil pattern (e.g., the first coil pattern 4921 of FIG. 4C). In this case, the protective layer 997 may be stacked on the first surface 991A to cover the first pattern layer 992. In an embodiment, the second pattern layer 993 may be provided on the second surface 991B to form a second coil pattern (e.g., the second coil pattern 4931 of FIG. 4D). In this case, the second pattern layer 993 may be omitted from a portion of the second surface 991B corresponding to the overlapping area O and may be provided to each of the first pattern area P1 and the second pattern area P2 to form the separate second coil patterns (e.g., the second coil patterns 4931a and 4931b of FIG. 4D), respectively. In an embodiment, the plurality of vias 994 may connect the first pattern layer 992 and the second pattern layer 993 by passing through the base member 991. In this case, the plurality of vias 994 may be provided to the first pattern area P1 and the second pattern area P2, respectively, and may simultaneously connect the second coil pattern of the first pattern area P1 and the second coil pattern of the second pattern area P2 to the first coil pattern. In an embodiment, the first shielding layer 9951 and the heat dissipation layer 996 may be sequentially stacked to cover the second pattern layer 993 provided in the pattern area.

In an embodiment, in the antenna module 990, the second pattern layer 993, the first shielding layer 9951, and the heat dissipation layer 996 may be omitted in the overlapping area O. Therefore, the overlapping area O may have a relatively thin thickness compared to that of the pattern area in a direction of the second surface 991B. In this case, in a state in which the FPCB 963 is positioned in the overlapping area O, the thickness of the pattern area P1 and P2 of the antenna module 990 may be substantially equal to or greater than the overlapping thickness of the overlapping area O and the FPCB 963. For example, in a state of viewing the second surface 991B of the antenna module 990, the surface of the pattern areas P1 and P2 may have a step substantially equal to or greater than that of the surface of the FPCB 963 positioned in the overlapping area O.

In an embodiment, when the battery 980 is overlappingly provided (e.g., disposed) to the antenna module 990 based on the FPCB 963 as shown in FIG. 9A, the FPCB 963 may be provided in a space formed by the overlapping area O of the antenna module 990 as shown in FIG. 9B and may minimize a cross-sectional thickness according to overlapping of the battery 980, the FPCB 963, and the antenna module 990 accordingly. Therefore, when an internal part arrangement space of the electronic device 801 is narrow, for example, when the antenna module 990 and the battery 980 are overlappingly provided, the arrangement space of the FPCB 963 may be secured through the overlapping area O of the antenna module 990.

Figure 10A:
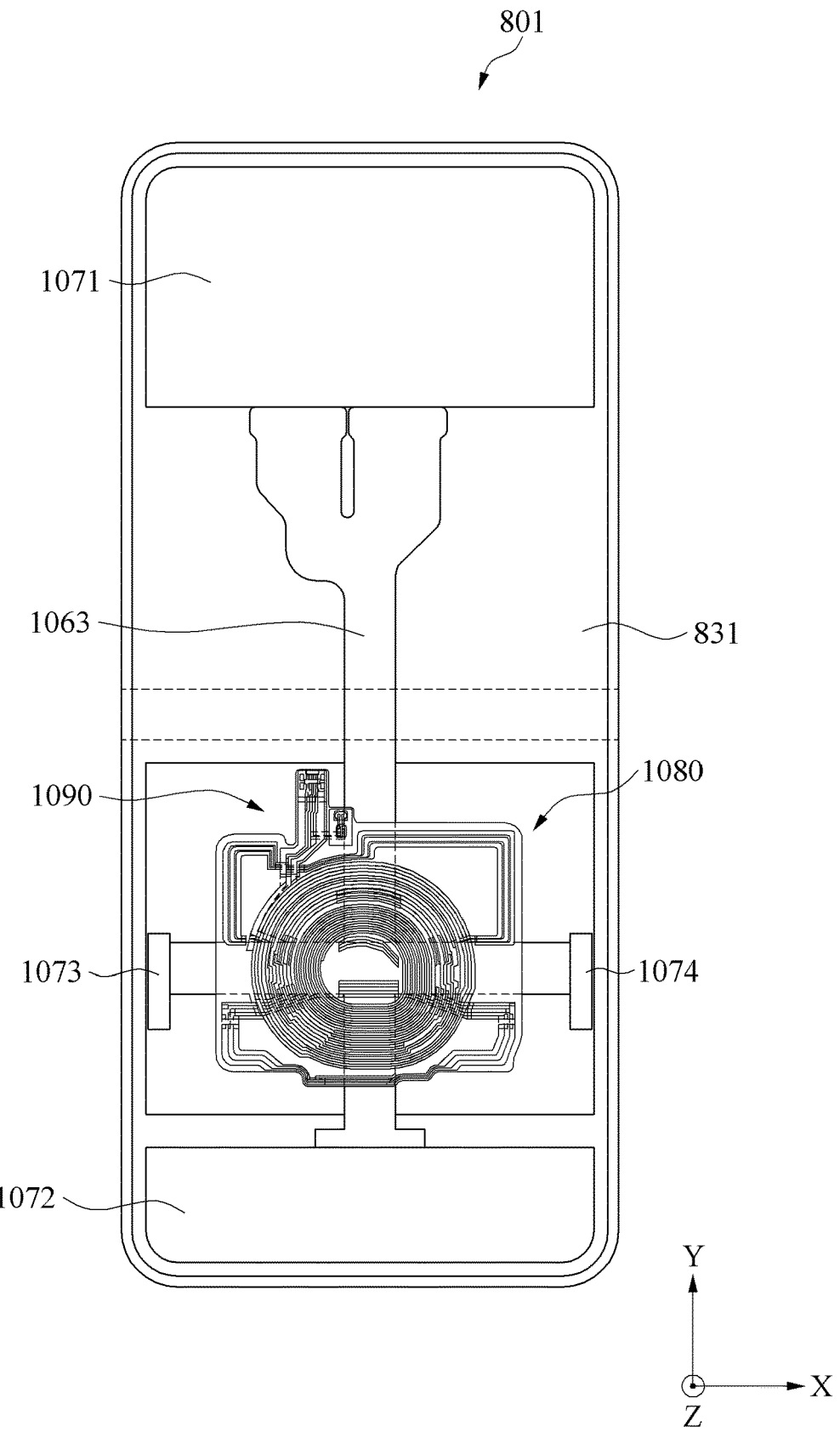
FIG. 10A illustrates an example of an arrangement state of an antenna module, an FPCB, and a battery in an unfolded state of an electronic device according to an embodiment.
Figures 10B, 10C:
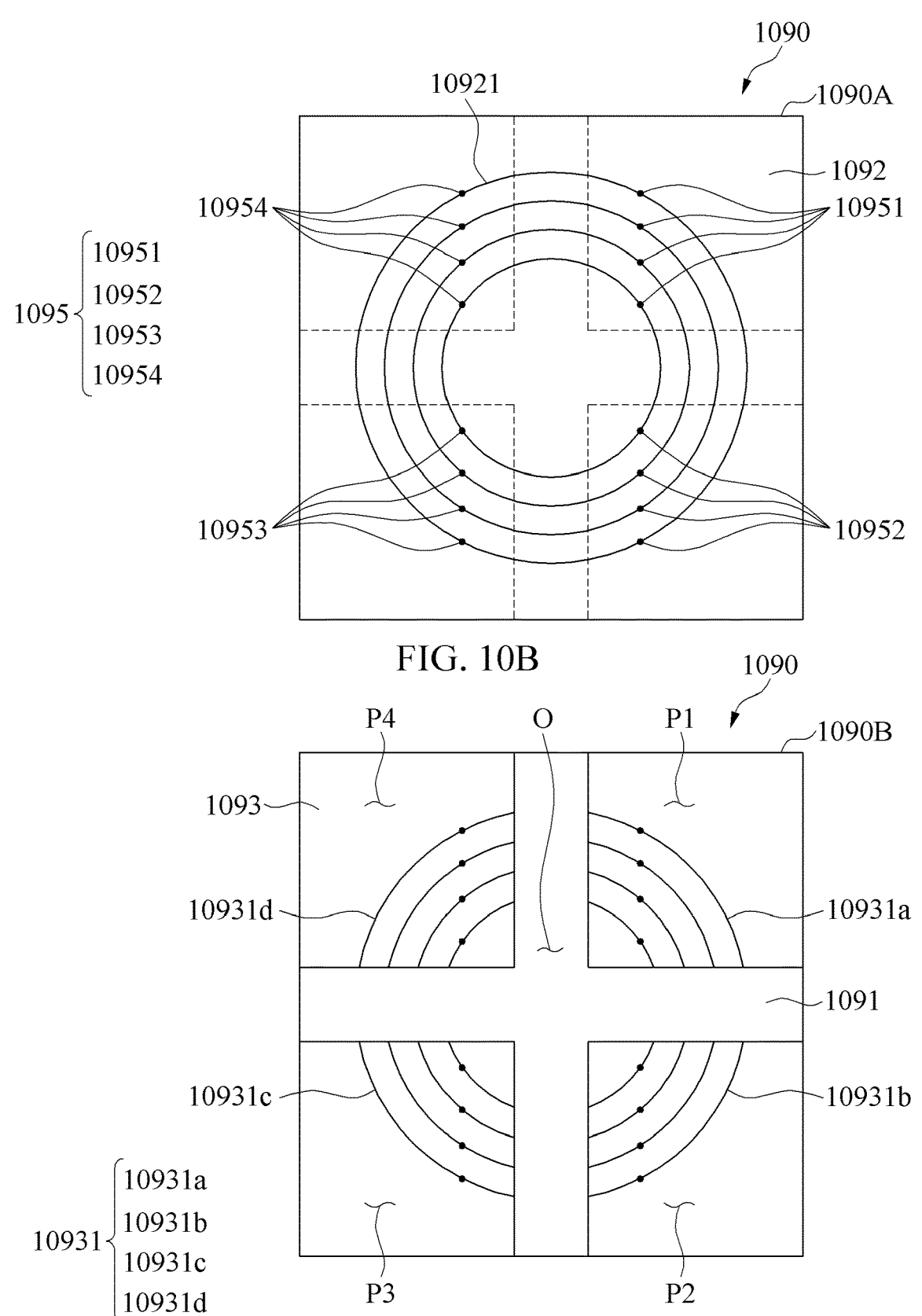
FIG. 10B and FIG. 10C illustrates a first pattern layer and a second pattern layer of an antenna module of FIG. 10A.

FIG. 10A illustrates an example of an arrangement state of an antenna module, an FPCB, and a battery in an unfolded state of an electronic device according to an embodiment, and FIGS. 10B and 10C illustrate a first pattern layer and a second pattern layer of an antenna module of FIG. 10A.

Referring to FIGS. 10A, 10B and 10C, an electronic device 801 (e.g., the electronic device 101 of FIG. 1) according to an embodiment may include a plurality of PCBs 1071, 1072, 1073, and 1074, an FPCB 1063 configured to connect the plurality of PCBs 1071, 1072, 1073, and 1074, and an antenna module 1090 (e.g., the antenna module 297 of FIG. 2) overlappingly provided (e.g., disposed) to the FPCB 1063 in a state of viewing the display 831.

In an embodiment, the FPCB 1063 may simultaneously connect the plurality of PCBs 1071, 1072, 1073, and 1074. For example, when the first PCB 1071, the second PCB 1072, the third PCB 1073, and the fourth PCB 1074 are provided (e.g., disposed) in the electronic device 801, the FPCB 1063 may be provided between the plurality of PCBs 1071, 1072, 1073, and 1074 and may simultaneously connect the plurality of PCBs 1071, 1072, 1073, and 1074 through an end that extends to each PCB 1071, 1072, 1073, 1074. In an embodiment, the FPCB 1063 may be formed with a shortened connection length to improve stability according to signal transmission between the PCBs. For example, when the plurality of PCBs 1071, 1072, 1073, and 1074 are provided in a cross shape of FIG. 10A, the FPCB 1063 may be formed in a cross shape with an end that extends to each PCB 1071, 1072, 1073, 1074.

In an embodiment, the antenna module 1090 may be overlappingly provided (e.g., disposed) to the FPCB 1063 at a state of viewing the display 831. In an embodiment, the antenna module 1090 may be provided in the electronic device 801 to face the FPCB 1063 through the second antenna surface 1090B opposite to the first antenna surface 1090A. In an embodiment, the antenna module 1090 may include a base member 1091, a first pattern layer 1092 provided to member 1091 toward the first antenna surface 1090A and configured to form a first coil pattern 10921 as shown in FIG. 10B, and a second pattern layer 1093 provided to the base member 1091 toward the second antenna surface 1090B and configured to form the second coil pattern 10931 as shown in FIG. 10C.

In an embodiment, in a state of viewing the display 831, the antenna module 1090 may include the overlapping area O that overlaps the FPCB 1063 and a plurality of pattern areas separated from each other by the overlapping area O. In an embodiment, the overlapping area O may be formed in a form in which the antenna module 1090 overlaps the FPCB 1063. For example, when the FPCB 1063 that overlaps antenna module 1090 is formed in a cross shape as shown in FIG. 10A, the overlapping area O may be formed in a corresponding cross shape as shown in FIG. 10B. In this case, the antenna module 1090 may include a first pattern area P1, a second pattern area P2, a third pattern area P3, and a fourth pattern area P4 that are separated from each other by the overlapping area O.

In an embodiment, in the antenna module 1090, because the second pattern layer 1093 is omitted in the overlapping area O, a thickness of the overlapping area O may be formed to have a relatively thin thickness compared to that of the pattern areas P1, P2, P3, and P4. In this case, each second coil pattern 10931 formed through the second pattern layer 1093 may be formed in each of the pattern areas P1, P2, P3, and P4 that are separated through the overlapping area O. For example, the second coil pattern 10931 may include a first separation pattern 10931a formed in the first pattern area P1, a second separation pattern 10931b formed in the second pattern area P2, a third separation pattern 10931c formed in the third pattern area P3, and a fourth separation pattern 10931d formed in the fourth pattern area P4. In an embodiment, a plurality of vias 1095 configured to connect the first pattern layer 1092 and the second pattern layer 1093 may be formed in the respective pattern areas P1, P2, P3, and P4. In this case, because each via 1095 connects the first pattern layer 1092 and the second pattern layer 1093 by passing through the base member 1091, the first coil pattern 10921 and the second coil pattern 10931 may be electrically connected. For example, the plurality of vias 1095 may include a first via 10951 provided in the first pattern area P1 to connect the first separation pattern 10931a to the first coil pattern 10921, a second via 10952 provided in the second pattern area P2 to connect the second separation pattern 10931b to the first coil pattern 10921, a third via 10953 provided in the third pattern area P3 to connect the third separation pattern 10931c to the first coil pattern 10921, and a fourth via 10954 provided in the fourth pattern area P4 to connect the fourth separation pattern 10931d to the first coil pattern 10921. In this case, because the first separation pattern 10931a, the second separation pattern 10931b, the third separation pattern 10931c, and the fourth separation pattern 10931d that are separated from each other by the overlapping area O are simultaneously connected to the first coil pattern 10921 through the plurality of vias 1095, the first coil pattern 10921 and the second coil pattern 10931 may serve as a single connected coil.

Figure 11A:
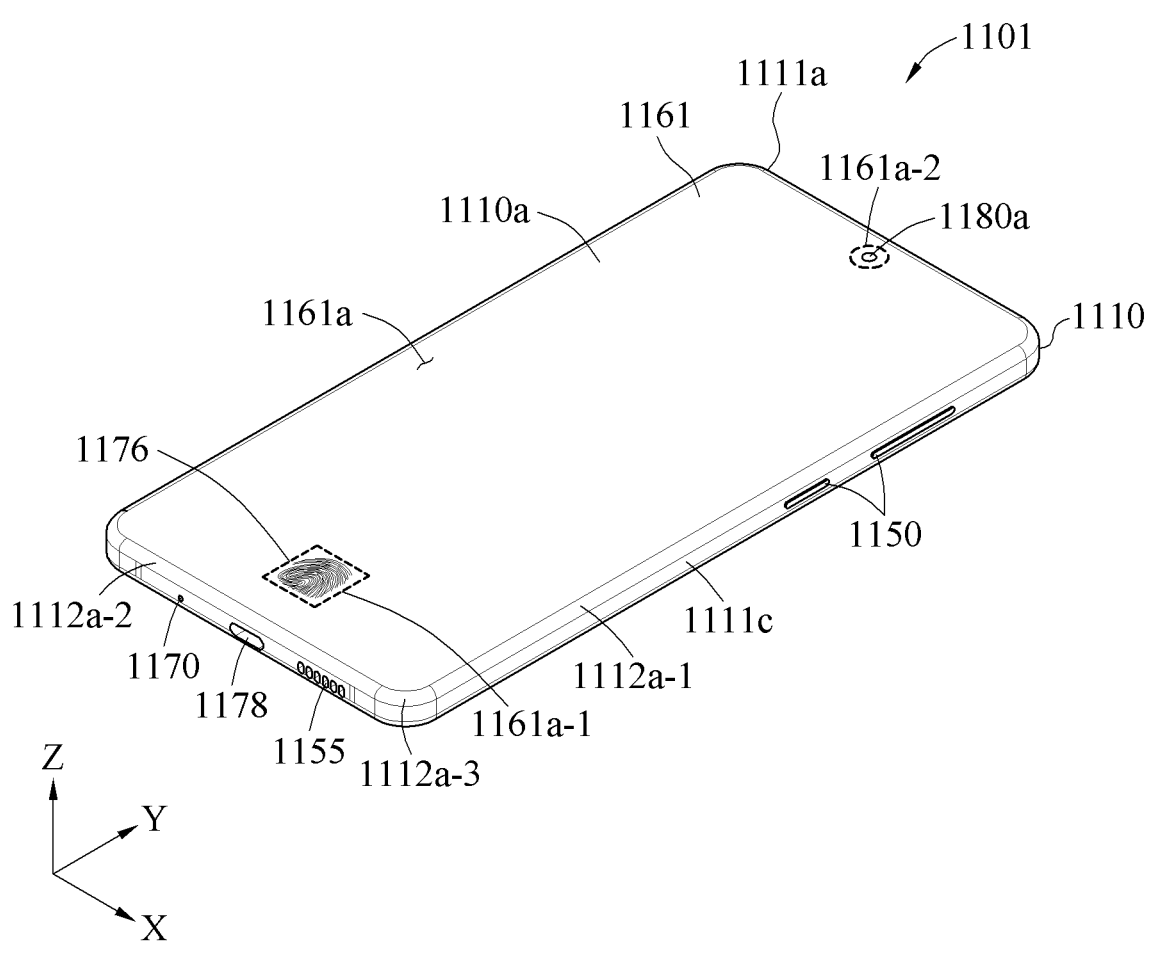
FIG. 11A is a front perspective view illustrating an electronic device according to embodiments.
Figure 11B:
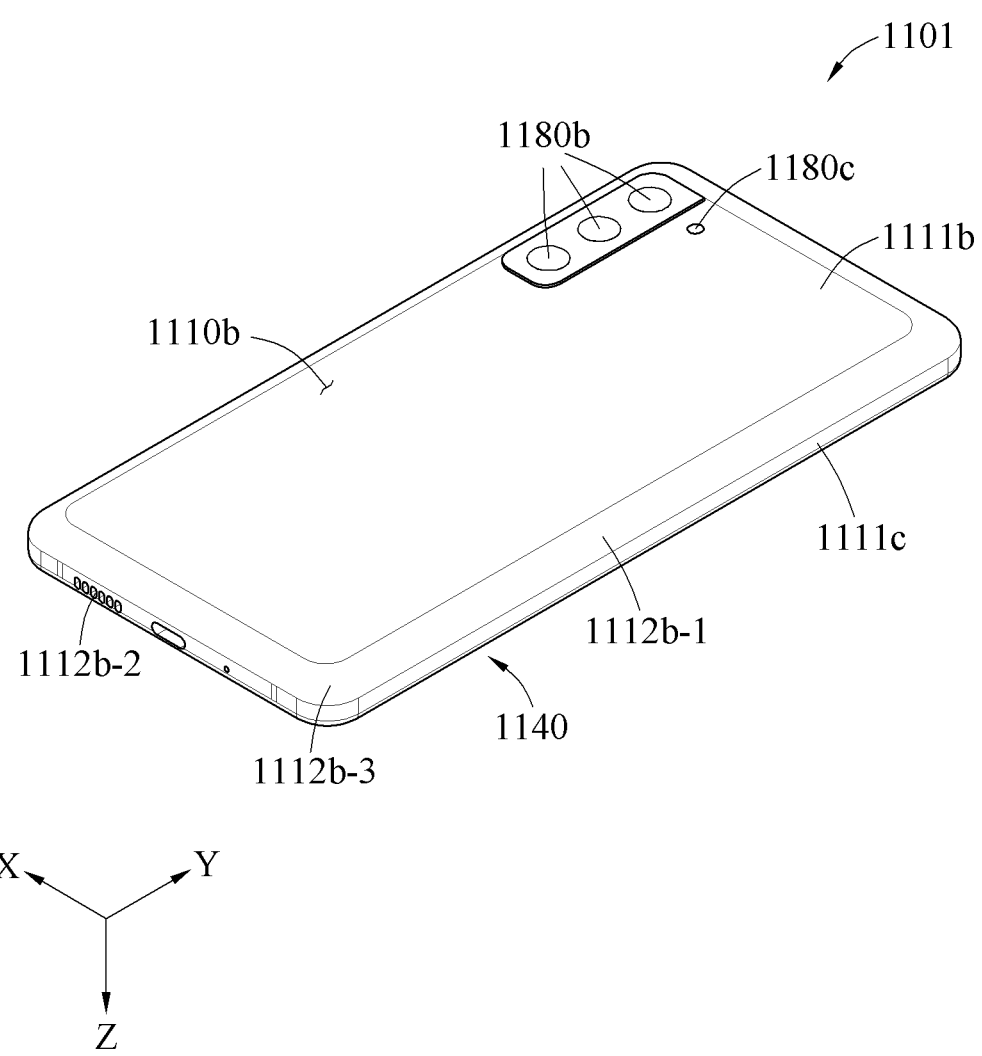
FIG. 11B is a rear perspective view illustrating an electronic device according to embodiments.
Figure 11C:
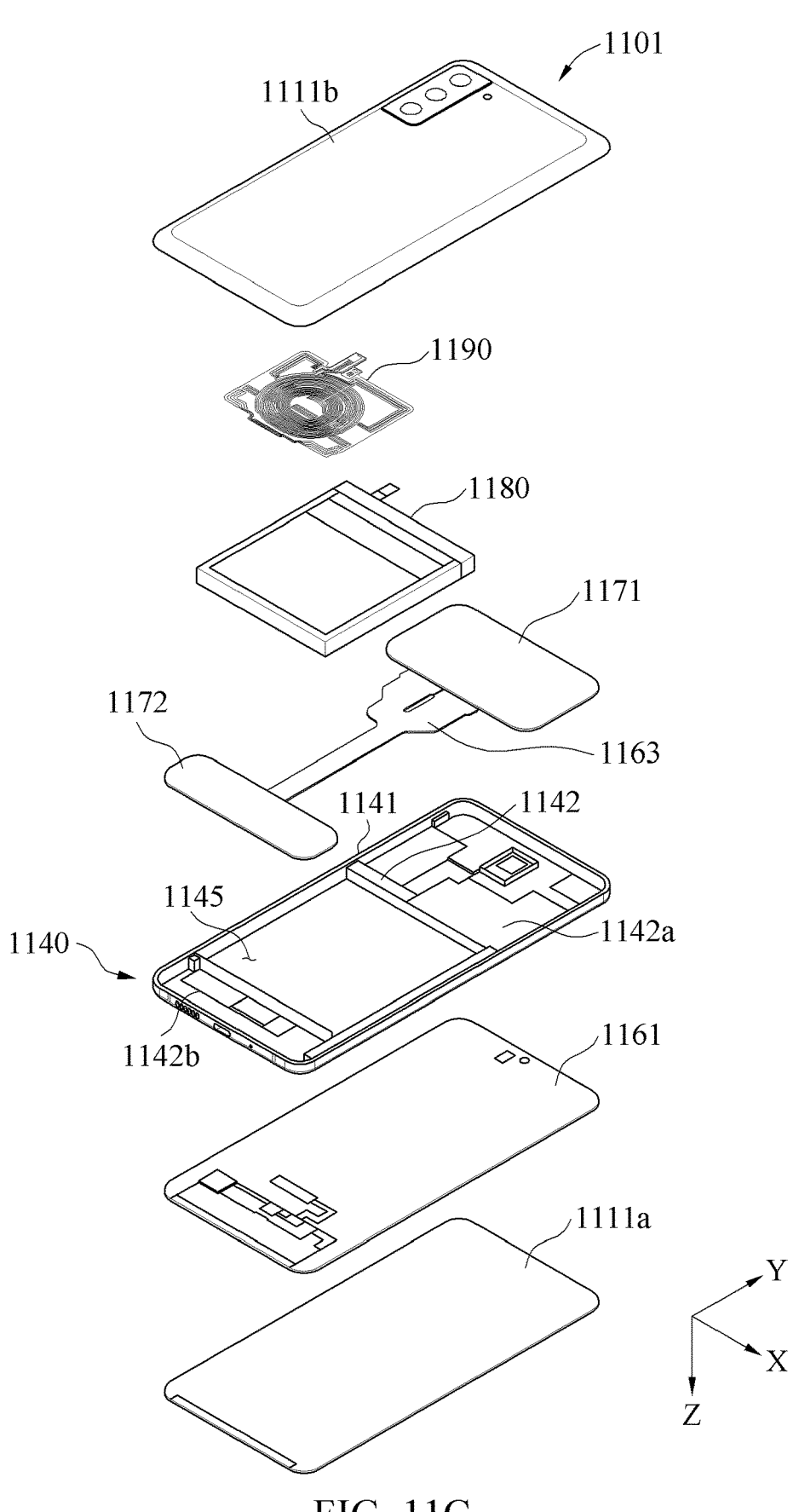
FIG. 11C is an exploded perspective view illustrating an electronic device according to embodiments.

FIG. 11A is a front perspective view illustrating an electronic device according to embodiments, FIG. 11B is a rear perspective view illustrating an electronic device according to embodiments, and FIG. 11C is an exploded perspective view illustrating an electronic device according to embodiments.

Referring to FIGS. 11A to 11C, an electronic device 1101 (e.g., the electronic device 101 of FIG. 1) according to an embodiment may include a housing 1110 having a front surface 1110*a* (e.g., a first housing surface), a rear surface 1110*b* (e.g., a second housing surface), and a side surface 1111*c* (e.g., a third housing surface) that surrounds an inner space between the front surface 1110*a* and the rear surface 1110*b*.

In an embodiment, the front surface 1110*a* may be formed by a first plate 1111*a* of which at least a portion is substantially transparent. For example, the first plate 1111*a* may include a glass plate or a polymer plate including at least one coating layer. In an embodiment, the rear surface 1110*b* may be formed by a second plate 1111*b* that is substantially opaque. For example, the second plate 1111*b* may be formed using coated or tinted glass, ceramic, polymer, metal (e.g., aluminum, stainless steel, or magnesium), or a combination thereof. The side surface 1111*c* may be formed by a side member 1140 that is coupled to the first plate 1111*a* and the second plate 1111*b* and includes metal and/or polymer. In an embodiment, the second plate 1111*b* and the side member 1140 may be integrally seamlessly formed. In an embodiment, the second plate 1111*b* and the side member 1140 may be formed using a substantially same material (e.g., aluminum).

In an embodiment, the first plate 1111*a* may include a plurality of first edge areas 1112*a*-1 that is rounded from at least a partial area of the front surface 1110*a* toward the second plate 1111*b* and extends in one direction (e.g., +/−X-axis direction), a plurality of second edge areas 1112*a*-2 that is rounded from at least a partial area of the front surface 1110*a* toward the second plate 1111*b* and extends in another direction (e.g., +/−Y-axis direction), and a plurality of third edge areas 1112*a*-3 that is rounded from at least a partial area of the front surface 1110*a* toward the second plate 1111*b* between the plurality of first edge areas 1112*a*-1 and the plurality of second edge areas 1112*a*-2.

In an embodiment, the second plate 1111*b* may include a plurality of fourth edge areas 1112*b*-1 that is rounded from at least a partial area of the rear surface 1110*b* toward the first plate 1111*a* and extends in one direction (e.g., +/−X-axis direction), a plurality of fifth edge areas 1112*b*-2 that is rounded from at least a partial area of the rear surface 1110*b* toward the first plate 1111*a* and extends in one direction (e.g., +/−Y-axis direction), and a plurality of sixth edge areas 1112*b*-3 that is rounded from at least a partial area of the rear surface 1110*b* toward the first plate 1111*a* between the plurality of fourth edge areas 1112*b*-1 and the plurality of fifth edge areas 1112*b*-2.

In an embodiment, the side member 1140 may surround at least a portion of the inner space between the front surface 1110*a* and the rear surface 1110*b*. The side member 1140 may include a first support structure 1141 provided to at least a portion of the side surface 111*c* and a second support structure 1142 configured to connect to the first support structure 1141 and to form an arrangement space of parts of the electronic device 1101. In an embodiment, the first support structure 1141 may form the side surface 1111*c* of the housing 1110 by connecting edges of the first plate 1111*a* and the second plate 1111*b* and by surrounding a space between the first plate 1111*a* and the second plate 1111*b*. In an embodiment, the second support structure 1142 may be provided in the electronic device 1101 (or a body portion). The second support structure 1142 may be integrally formed with the first support structure 1141 and may be separately formed and connected to the first support structure 1141. In an embodiment, PCBs 1171 and 1172 may be provided to the second support structure 1142. The second support structure 1142 may be connected to ground of the PCBs 1171 and 1172. In an embodiment, a display 1161 may be positioned on one surface (e.g., a bottom surface (+Z-axis direction surface) of FIG. 11C) of the second support structure 1142 and the second plate 1111*b* may be provided on another surface (e.g., a top surface (−Z-axis direction surface) of FIG. 11C) of the second support structure 1142.

In an embodiment, at least a portion of the side member 1140 may be formed of a conductive material. For example, the first support structure 1141 may be formed of metal and/or a polymer material having conductivity. In an embodiment, the second support structure 1142 may be formed of metal and/or a polymer material having conductivity, which is similar to the first support structure 1141.

In an embodiment, the electronic device 1101 may include the display 1161 (e.g., the display module 160 of FIG. 1). In an embodiment, the display 1161 may be positioned on the front surface 1110*a*. In an embodiment, the display 1161 may be visually exposed through at least a portion of the first plate 1111*a* (e.g., the plurality of first edge areas 1112*a*-1, the plurality of second edge areas 1112*a*-2, and the plurality of third edge areas 1112*a*-3). In an embodiment, the display 1161 may have a shape substantially identical to that of an outer edge shape of the first plate 1111*a*. In some embodiments, the edge of the display 1161 may substantially match the outer edge of the first plate 1111*a*. In an embodiment, the display 1161 may include a touch sensing circuit, a pressure sensor configured to sense intensity (pressure) of touch, and/or a digitizer configured to detect a stylus pen of a magnetic field scheme.

In an embodiment, the display 1161 may include a screen display area 1161*a* visually exposed and configured to display content through pixels or plurality of cells. In an embodiment, the screen display area 1161*a* may include a sensing area 1161*a*-1 and a camera area 1161*a*-2. In this case, the sensing area 1161*a*-1 may overlap at least a partial area of the screen display area 1161*a*. The sensing area 1161*a*-1 may allow transmission of an input signal related to a sensor module 1176 (e.g., the sensor module 176 of FIG. 1). The sensing area 1161*a*-1 may display content, which is similar to the screen display area 1161*a* that does not overlap the sensing area 1161*a*-1. For example, while the sensor module 1176 does not operate, the sensing area 1161*a*-1 may display content. The camera area 1161*a*-2 may overlap at least a partial area of the screen display area 1161*a*. The camera area 1161*a*-2 may allow transmission of an optical signal related to a first camera module 1180*a* (e.g., the camera module 180 of FIG. 1). The camera area 1161*a*-2 may display content, which is similar to the screen display area 1161*a* that does not overlap the camera area 1161*a*-2. For example, the camera area 1161*a*-2 may display content while the first camera module 1180*a* does not operate.

In an embodiment, the electronic device 1101 may include an audio module 1170 (e.g., the audio module 170 of FIG. 1). The audio module 1170 may acquire sound from the outside of the electronic device 1101 and generate an electrical signal based on the sound. For example, the audio module 1170 may be positioned on the side surface 1111*c* of the housing 1110. In an embodiment, the audio module 1170 may acquire sound through at least one hole.

In an embodiment, the electronic device 1101 may include a sensor module 1176. The sensor module 1176 may sense a signal applied to the electronic device 1101. The sensor module 1176 may be positioned on, for example, the front surface 1110*a* of the electronic device 1101. The sensor module 1176 may form the sensing area 1161*a*-1 in at least a portion of the screen display area 1161*a*. The sensor module 1176 may receive an input signal that passes through the sensing area 1161*a*-1 and may generate an electrical signal based on the received input signal. For example, the input signal may have a designated physical quantity (e.g., heat, light, temperature, sound, pressure, ultrasound). As another example, the input signal may include a signal related to biometric information of a user (e.g., a fingerprint, voice of the user).

In an embodiment, the electronic device 1101 may include a second camera module 1180*b* (e.g., the camera module 180 of FIG. 1). In an embodiment, the electronic device 1101 may include the first camera module 1180*a*, the second camera module 1180*b*, and a flash 1180*c*. In an embodiment, the first camera module 1180*a* may be provided (e.g., disposed) to be exposed through the front surface 1110*a* of the housing 1110 and the second camera module 1180*b* and the flash 1180*c* may be provided to be exposed through the rear surface 1110*b* of the housing 1110. In an embodiment, at least a portion of the first camera module 1180*a* may be provided to the housing 1110 to be covered through the display 1161. In an embodiment, the first camera module 1180*a* may receive an optical signal that passes through the camera area 1161*a*-2 and generate an electrical signal based on the optical signal. In an embodiment, the second camera module 1180*b* may include a plurality of cameras (e.g., a dual camera, a triple camera, and a quad camera), each of which may receive an optical signal and generate an electrical signal based on the optical signal. In an embodiment, the flash 1180*c* may include a light emitting diode or a xenon lamp.

In an embodiment, the electronic device 1101 may include a sound output module 1155 (e.g., the sound output module 155 of FIG. 1). The sound output module 1155 may output sound to the outside of the electronic device 1101. For example, the sound output module 1155 may output sound to the outside of the electronic device 1101 through at least one hole formed in the side surface 1111*c* of the housing 1110. In another embodiment, the sound output module 1155 may include a piezo speaker in which the sound output hole is omitted on the side surface 1111*c* of the housing 1110.

In an embodiment, the electronic device 1101 may include an input module 1150 (e.g., the input module 150 of FIG. 1). The input module 1150 may receive an input of a manipulation signal of the user. The input module 1150 may include, for example, at least one key input device that is exposed on the side surface 1111*c* of the housing 1110.

In an embodiment, the electronic device 1101 may include a connecting terminal 1178 (e.g., the connecting terminal 178 of FIG. 1). In an embodiment, the connecting terminal 1178 may be provided on the side surface 1111*c*. For example, when viewing the electronic device 1101 in one direction (e.g., +Y-axis direction of FIG. 3A), the connecting terminal 1178 may be provided in a central portion of the side surface 1111*c* and the sound output module 1155 may be provided in one direction (e.g., a right direction) based on the connecting terminal 1178.

In an embodiment, the electronic device 1101 may include PCBs 1171 and 1172 and a battery 1180 (e.g., the battery 189 of FIG. 1) provided (e.g., disposed) in the housing 1110. In an embodiment, the PCBs 1171 and 1172 may include a first PCB 1171 and a second PCB 1172 that are spaced apart from each other. For example, the first PCB 1171 may be received in a first substrate slot 1142*a* of the second support structure 1142 and the second PCB 1172 may be received in a second substrate slot 1142*b* of the second support structure 1142. In an embodiment, the first PCB 1171 and the second PCB 1172 may be connected through an FPCB 1163.

In an embodiment, the battery 1180 may be received in a battery slot 1145 of the second support structure 1142 formed between the first substrate slot 1142*a* and the second substrate slot 1142*b*. In an embodiment, the battery 1180 may be electrically connected to the PCBs 1171 and 1172 and may supply power to parts mounted to the PCBs 1171 and 1172.

In an embodiment, a processor (e.g., the processor 120 of FIG. 1) may be provided to the PCBs 1171 and 1172. For example, the processor may include at least one of a CPU, an AP, an image signal processor, a sensor hub processor, and a communication processor. In an embodiment, a wireless communication circuitry (e.g., the wireless communication module 192 of FIG. 1) may be provided on the PCBs 1171 and 1172. The wireless communication circuitry may communicate with, for example, an external device (e.g., the electronic device 104 of FIG. 1). In an embodiment, the electronic device 1101 may include an antenna module 1190 provided in the housing 1110 and the wireless communication circuitry may be electrically connected to the antenna module 1190. In an embodiment, the antenna module 1190 may be provided in the housing 1110 between the first PCB 1171 and the second PCB 1172. In an embodiment, the antenna module 1190 may be a coil antenna that serves as, for example, an NFC antenna, a wireless charging antenna, and/or an MST antenna.

Figure 12A:
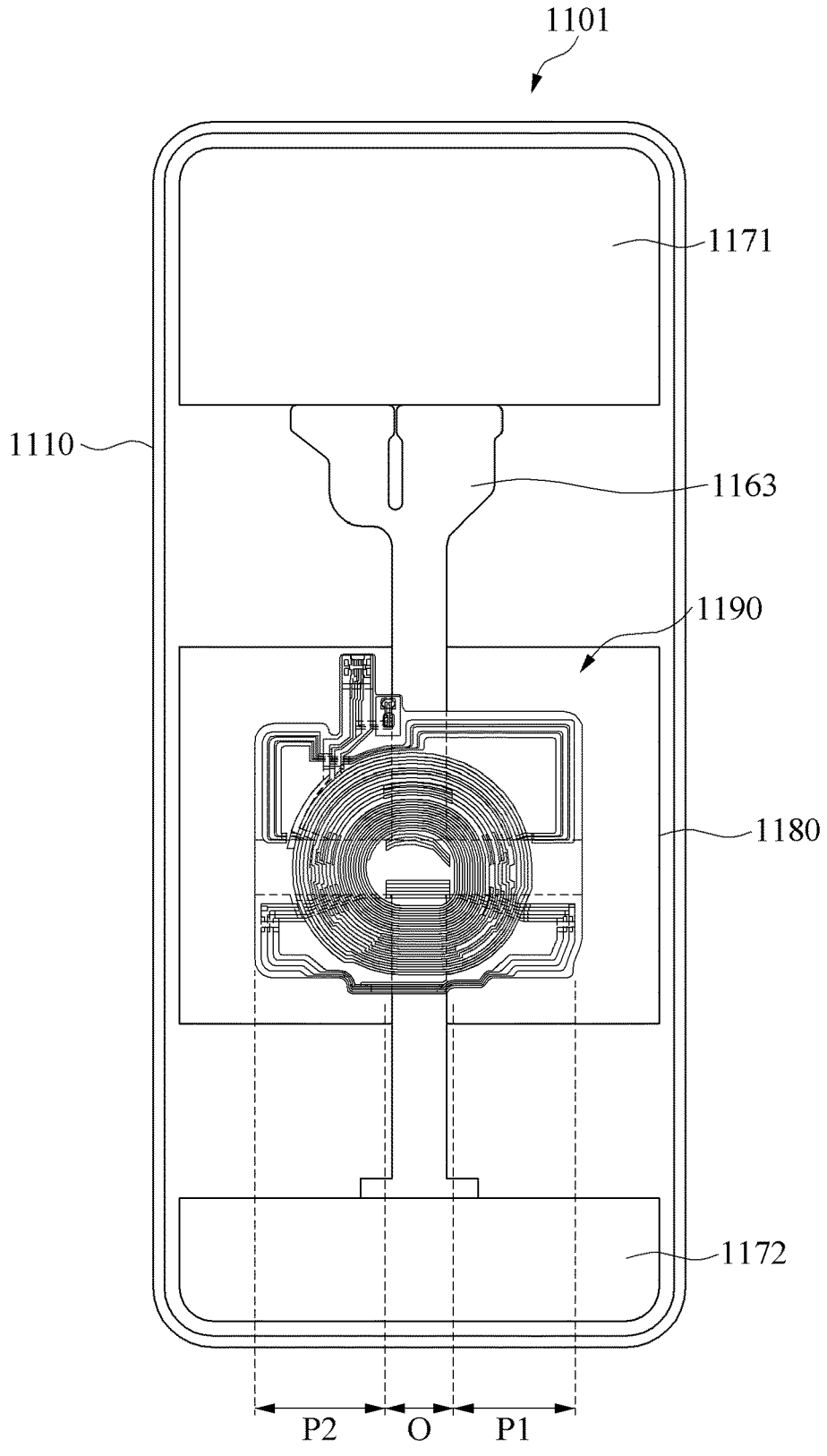
FIG. 12A illustrates an example of an arrangement state of an antenna module, a PCB, an FPCB, and a battery in an electronic device according to an embodiment.

FIG. 12A illustrates an example of an arrangement state of an antenna module, a PCB, an FPCB, and a battery in an electronic device according to an embodiment.

Referring to FIG. 12A, the electronic device 1101 (e.g., the electronic device 101 of FIG. 1) according to an embodiment may include the housing 1110, the first PCB 1171, the second PCB 1172, the FPCB 1163, the antenna module 1190 (e.g., the antenna module 297 of FIG. 2), and the battery 1180.

In an embodiment, the first PCB 1171 and the second PCB 1172 may be provided (e.g., disposed) to be spaced apart in the housing 1110 and both ends of the FPCB 1163 may be connected to the first PCB 1171 and the second PCB 1172. In an embodiment, the FPCB 1163 may be formed in a form with a short connection length, for example, in a straight form of FIG. 12A, to make it possible to improve signal transmission efficiency between the first PCB 1171 and the second PCB 1172.

In an embodiment, the antenna module 1190 may be provided (e.g., disposed) in the housing 1110 to at least partially overlap the FPCB 1163. In an embodiment, the antenna module 1190 may be formed in a plate form and coil patterns (e.g., the first coil pattern 4921 of FIG. 4C and the second coil pattern 4931 of FIG. 4D) may be formed on both surfaces of the antenna module 1190, respectively.

In an embodiment, the antenna module 1190 may include the overlapping area O that overlaps the FPCB 1163 and a first pattern area P1 and a second pattern area P2 that are separated from each other by the overlapping area O. In the antenna module 1190, a thickness of the overlapping area O that overlaps the FPCB 1163 may be less than that of the first pattern area P1 and the second pattern area P2. For example, a pattern layer (e.g., the second pattern layer 493 of FIG. 5A) for forming the coil pattern on a face on which the antenna module 1190 faces the FPCB 1163 and other members (e.g., the first shielding layer 5951 or the heat dissipation layer 596 of FIG. 5A) may be omitted in the overlapping area O of the antenna module 1190. Therefore, while the antenna module 1190 is provided in the housing 1110 in an overlapping state with the FPCB 1163, the overlapping thickness may be minimized.

In an embodiment, the battery 1180 may be provided (e.g., disposed) in the housing 1110 to overlap the antenna module 1190 based on the FPCB 1163. In this case, because a space corresponding to the thickness of the FPCB 1163 is secured through the overlapping area O of the antenna module 1190, an internal space of the housing 1110 for providing the battery 1180 may be secured.

Figure 12B:
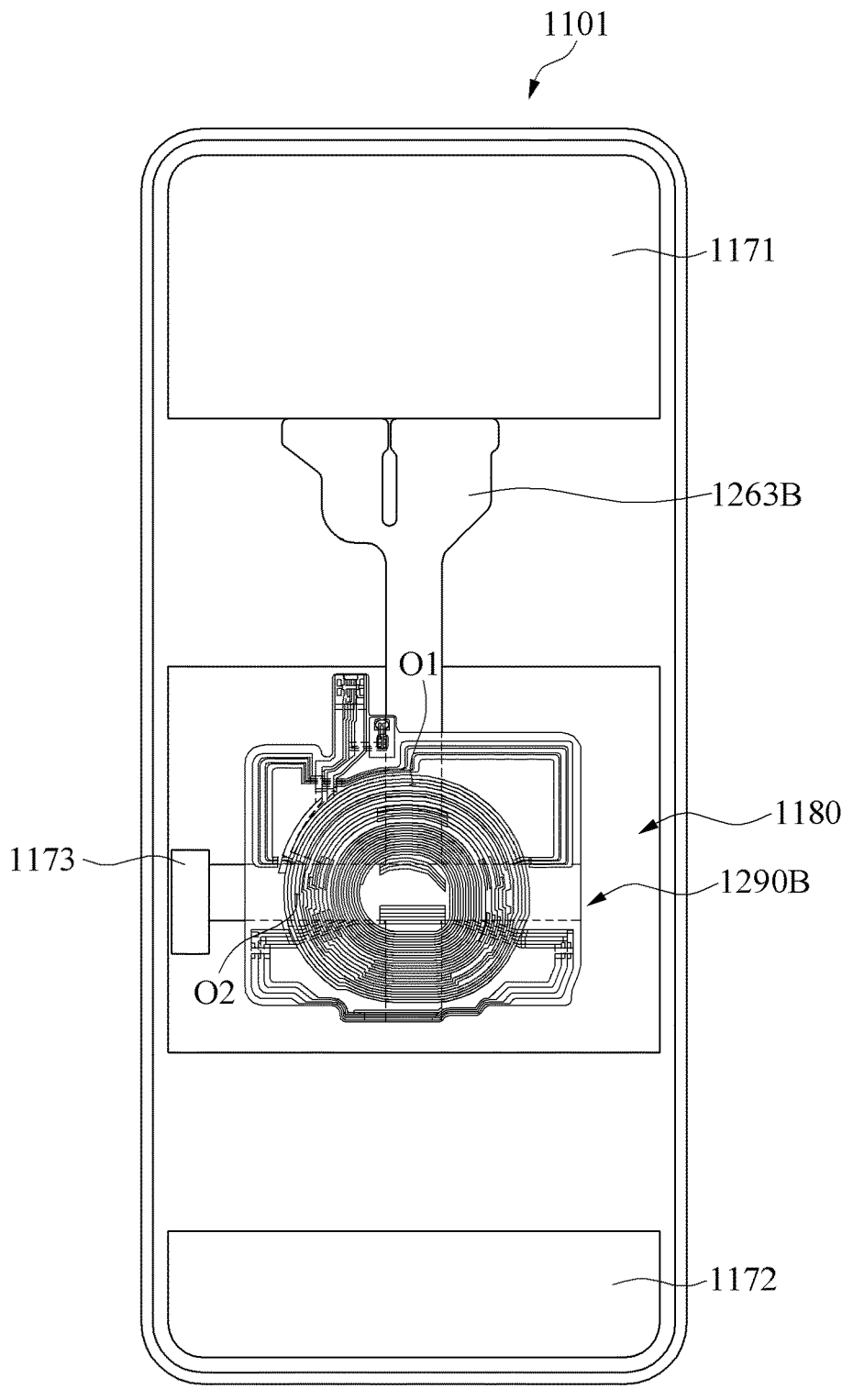
FIG. 12B illustrates an example of an arrangement state of an antenna module, a PCB, an FPCB, and a battery in an electronic device according to an embodiment.
Figure 12C:
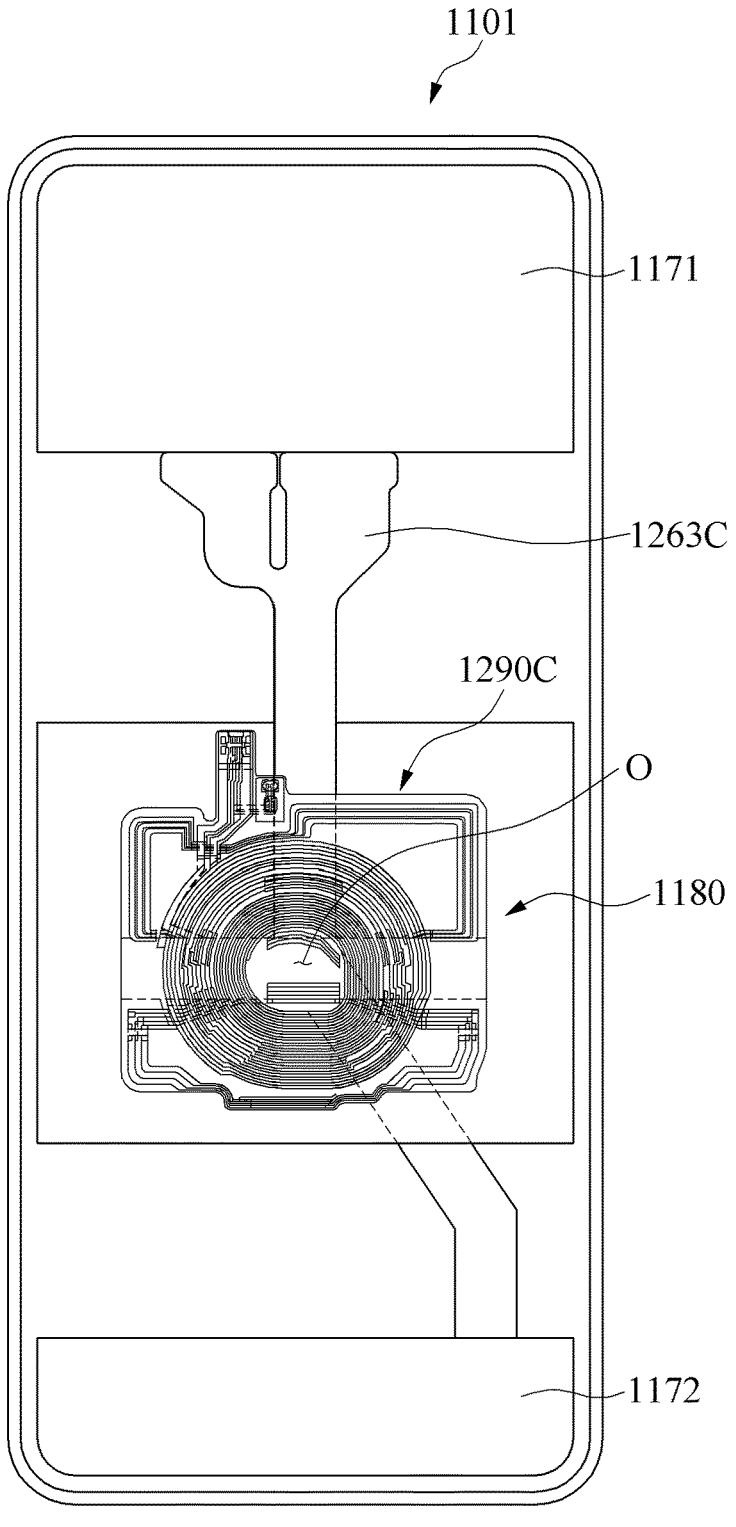
FIG. 12C illustrates an example of an arrangement state of an antenna module, a PCB, an FPCB, and a battery in an electronic device according to an embodiment.

FIG. 12B illustrates an example of an arrangement state of an antenna module, a PCB, an FPCB, and a battery in an electronic device according to an embodiment, and FIG. 12C illustrates an example of an arrangement state of an antenna module, a PCB, an FPCB, and a battery in an electronic device according to an embodiment.

Referring to FIGS. 12B and 12C, FPCBs 1263B and 1263C according to an embodiment may be formed to secure an optimal connection performance and manufacturing convenience according to a PCB arrangement in the electronic device 1101.

For example, when a third PCB 1173 is provided (e.g., disposed) between the first PCB 1171 and the second PCB 1172 and the FPCB 1263B connects the first PCB 1171 and the third PCB 1173 as shown in FIG. 12B, the FPCB 1263B may be in a partially bent simple shape and may vertically connect the first PCB 1171 and the third PCB 1173. In an embodiment, the antenna module 1290B,1290C may be overlappingly provided to the FPCB 1263B, 1263C through the overlapping area O formed to have a relatively thin thickness. In this case, the overlapping area O may be formed in a shape corresponding to a shape of the FPCB 1263B, 1263C. For example, the overlapping area O may include a first overlapping area O1 and a second overlapping area O2 configured to connect to the first overlapping area O1 in a bent form. A bent portion of the FPCB 1263B may be overlappingly provided to the antenna module 1290B through the first overlapping area O1 and the second overlapping area O2.

As another example, when the FPCB 1263C connects the first PCB 1171 and the second PCB 1172 as shown in FIG. 12C, at least a portion of the FPCB 1263C may be formed in a bent shape according to a connector position of a PCB. In this case, a shape of the overlapping area O is formed to correspond to the bent shape of the FPCB 1263C and the antenna module 1290C may reduce an overlapping thickness according to overlapping with the FPCB 1263C.

Therefore, in a state in which the FPCB 1263C and the antenna module 1290C overlap, because a space corresponding to the thickness of the FPCB 1263C is saved through the overlapping area O, an internal space of the housing 1110 for providing the battery 1180 may be secured.

In accordance with an aspect of the disclosure, an electronic device may include: a display including a first area and a second area; a housing structure including a first housing supporting the first area and a second housing supporting the second area, wherein an inner space is provided between the housing structure and a rear surface of the display; a hinge structure foldably connecting the first housing and the second housing based on a folding axis so that the first housing and the second housing are foldable relative to each other on the folding axis between a first state in which the first area and the second area are substantially coplanar and a second state in which the first area and the second area face each other; a first printed circuit board (PCB) provided in the inner space; a second PCB provided in the inner space; a flexible PCB (FPCB) connecting the first PCB and the second PCB; and an antenna module provided in the inner space of the housing structure and overlapping the FPCB along a direction perpendicular to the rear surface of the display. The antenna module may include: a base member including a first surface, and a second surface opposite to the first surface and facing the FPCB; a first pattern layer provided on the first surface of the base member and forming a first coil pattern; a second pattern layer provided on the second surface of the base member and forming a second coil pattern; an overlapping area in which the FPCB is provided between portions of the second pattern layer; and a plurality of pattern areas in which the portions of the second coil pattern are respectively provided.

The antenna module may further include a plurality of vias provided in each of the plurality of pattern areas and electrically connecting the portions of the second coil pattern provided in each of the plurality of pattern areas to the first coil pattern.

The antenna module may further include a first shielding layer provided in the plurality of pattern areas on the second pattern layer.

The antenna module may further include a second shielding layer provided in the overlapping area on the second surface of the base member.

The first shielding layer and the second shielding layer may form an integrated shielding layer.

The first shielding layer may be spaced apart from the second shielding layer.

The antenna module may further include a heat dissipation layer in the plurality of pattern areas on the first shielding layer.

The FPCB may be provided in the overlapping area, and a surface of the second pattern layer may have a height substantially equal to or greater than that of a surface of the FPCB along the direction perpendicular to the rear surface of the display.

The plurality of pattern areas may include a first pattern area and a second pattern area that are separated from each other by the overlapping area. A portion of the second coil pattern may be provided in each of the first pattern area and the second pattern area.

The antenna module may further include a plurality of vias electrically connecting the first coil pattern and the second coil pattern. The first coil pattern may include a first separation pattern and a second separation pattern that are separate from each other. Each of the first separation pattern and the second separation pattern may be connected, through the plurality of vias, to the second coil pattern in the first pattern area and the second coil pattern in the second pattern area.

The electronic device may further include a battery provided in the inner space of the housing structure. The battery may overlap the overlapping area along the direction perpendicular to the rear surface of the display.

The FPCB may extend through the antenna module in a substantially straight line.

The overlapping area may include a first overlapping area extending in a first longitudinal direction and a second overlapping area connected to the first overlapping area and extending a second longitudinal direction that crosses the first longitudinal direction. The FPCB may be provided in the first overlapping area and the second overlapping area.

The first longitudinal direction may be substantially perpendicular to the second longitudinal direction.

The overlapping area and the FPCB may have substantially common widths in the overlapping area.

In accordance with an aspect of the disclosure, an electronic device may include: a housing including a front surface, a rear surface, and a side surface between the front surface and the rear surface; a display; a first printed circuit board (PCB) provided in an inner space of the housing; a second PCB provided in the inner space of the housing and spaced apart from the first PCB; an antenna module provided in the inner space of the housing; and a flexible PCB (FPCB) connecting the first PCB and the second PCB and extending in a first direction through the antenna module. The antenna module may include: a base member including a first surface, and a second surface opposite to the first surface and facing the FPCB; a first pattern layer provided on the first surface of the base member and forming a first coil pattern; a second pattern layer provided on the second surface of the base member and forming a plurality of second coil patterns; a plurality of pattern areas respectively corresponding to the plurality of second coil patterns; and an overlapping area in which the FPCB is provided, wherein the overlapping area separates the plurality of second coil patterns from each other.

The antenna module may further include a plurality of vias extending through the base member in each of the plurality of pattern areas and electrically connecting the plurality of second coil patterns to the first coil pattern.

The antenna module may further include: a first shielding layer provided in each of the plurality of pattern areas on the second pattern layer; and a second shielding layer provided in the overlapping area between the second surface and the FPCB.

The electronic device may further include a battery provided in the space of the housing. The overlapping area and the battery may overlap along a second direction perpendicular to the first direction.

In accordance with an aspect of the disclosure, an electronic device may include: a display including a first area and a second area; a first housing supporting the first area and forming a first space; a second housing supporting the second area and forming a second space; a hinge structure foldably connecting the first housing and the second housing based on a folding axis so that the first housing and the second housing are foldable relative to each other on the folding axis between a first state in which the first area and the second area are substantially coplanar and a second state in which the first area and the second area face each other; a first printed circuit board (PCB) provided in the first space; a second PCB provided in the second space; a flexible PCB (FPCB) connecting the first PCB and the second PCB and extending across the hinge structure; an antenna module provided in the first space or the second space, and overlapping the FPCB along a direction perpendicular to a surface of the display; and a battery provided in the first space or the second space, and overlapping the antenna module along the direction. The antenna module may include: a base member including a first surface, and a second surface opposite to the first surface and facing the FPCB; a first pattern layer provided on the first surface of the base member and forming a first coil pattern; a second pattern layer provided on the second surface of the base member and forming a second coil pattern; a plurality of vias electrically connecting the first coil pattern and the second coil pattern, and passing through the base member; and an overlapping area in which the FPCB is provided between portions of the second pattern layer.

In accordance with an aspect of the disclosure, an antenna module includes: a first coil provided on a first surface of a substrate; a first portion of a second coil provided on a second surface of the substrate; a second portion of the second coil provided on the second surface of the substrate and separated from the first portion of the second coil; and a plurality of vias that extend through the substrate and electrically connect the first portion of the second coil to the first coil, and the second portion of the second coil to the first coil.

Side surfaces of the first portion of the second coil and the second portion of the second coil may face each other, may be substantially perpendicular to the second surface of the substrate, and may define a space configured to accommodate a flexible printed circuit board.

The antenna module may further include a shielding layer that extends on the second surface of the substrate between the first portion of the second coil and the second portion of the second coil.

The antenna module may further include: a first shielding layer provided on the first portion of the second coil and the second portion of the second coil; and a second shielding layer that extends on the second surface of the substrate between the first portion of the second coil and the second portion of the second coil.

The antenna module may further include vertical shielding portions electrically connecting the first shielding layer and the second shielding layer.

A space may be provided on the second surface of the substrate between the first portion of the second coil and the second portion of the second coil.

The antenna module may further include a flexible printed circuit board that extends on the second surface of the substrate between the first portion of the second coil and the second portion of the second coil.

The antenna module may further include a battery. The flexible printed circuit board, the substrate and the battery may overlap each other along a direction perpendicular to the first surface of the substrate While aspects of embodiments have been particularly shown and described, it will be understood that various changes in form and details may be made therein without departing from the spirit and scope of the following claims.

What is claimed is:

1. An electronic device comprising:
a display comprising a first area and a second area;
a housing structure comprising a first housing supporting the first area and a second housing supporting the second area, wherein an inner space is provided between the housing structure and a rear surface of the display;
a hinge structure foldably connecting the first housing and the second housing;
a first printed circuit board (PCB) provided in the inner space;
a second PCB provided in the inner space;
a flexible PCB (FPCB) connecting the first PCB and the second PCB; and
an antenna module provided in the inner space of the housing structure and overlapping the FPCB in an overlapping area of the antenna module along a direction perpendicular to the rear surface of the display,
wherein the antenna module comprises:
a base member comprising a first surface, and a second surface opposite to the first surface and facing the FPCB;
a first pattern layer provided on the first surface of the base member and forming a first coil pattern, wherein, along the direction, the first coil pattern at least partially overlaps the FPCB; and a second pattern layer provided on the second surface of the base member and forming a plurality of second coil patterns with the overlapping area between the plurality of second coil patterns, wherein, along the direction, the plurality of second coil patterns at least partially overlaps the first coil pattern and does not overlap the FPCB.

2. The electronic device of claim 1, wherein the antenna module further comprises conductive vias between the first pattern layer and the second pattern layer that electrically couple the first coil pattern with the plurality of second coil patterns.

3. The electronic device of claim 2, wherein, along the direction, the conductive vias are not overlapped with the FPCB.

4. The electronic device of claim 1, wherein the antenna module further comprises a first shielding layer disposed on the second pattern layer.

5. The electronic device of claim 4, wherein the antenna module further comprises a second shielding layer disposed in the overlapping area on the second surface of the base member.

6. The electronic device of claim 5, wherein the first shielding layer is integrally formed with the second shielding layer.

7. The electronic device of claim 5, wherein the first shielding layer is spaced apart from the second shielding layer.

8. The electronic device of claim 4, wherein the antenna module further comprises a heat dissipation layer disposed on the first shielding layer.

9. The electronic device of claim 8, wherein an outer surface of the heat dissipation layer is substantially coplanar with an outer surface of the FPCB.

10. The electronic device of claim 1,
    wherein a surface of the second pattern layer has a height substantially equal to or greater than a height of a surface of the FPCB along the direction perpendicular to the rear surface of the display.

11. The electronic device of claim 1, wherein each of the plurality of second coil patterns is formed in a first pattern area and a second pattern area that are separated from each other by the overlapping area.

12. The electronic device of claim 11, wherein the antenna module further comprises a plurality of conductive vias electrically connecting the first coil pattern and the plurality of second coil patterns,
    wherein the first coil pattern comprises a first separation pattern and a second separation pattern that are separate from each other, and
    wherein each of the first separation pattern and the second separation pattern is connected, through the plurality of conductive vias, to one of the plurality of second coil patterns in the first pattern area and another one of the plurality of second coil patterns in the second pattern area.

13. The electronic device of claim 1, further comprising a battery provided in the inner space of the housing structure,
    wherein the battery at least partially overlaps the FPCB along the direction perpendicular to the rear surface of the display.

14. The electronic device of claim 1, wherein the FPCB extends through the antenna module in a substantially straight line.

15. The electronic device of claim 1, wherein the overlapping area comprises a first overlapping area extending in a first longitudinal direction and a second overlapping area connected to the first overlapping area and extending a second longitudinal direction that crosses the first longitudinal direction, and
    wherein the FPCB is provided in the first overlapping area and the second overlapping area.

16. The electronic device of claim 1, wherein, along the direction, the first coil pattern is at least partially overlapped with the plurality of second coil patterns.

17. An electronic device comprising:
    a housing comprising a front surface, a rear surface, and a side surface between the front surface and the rear surface;
    a display;
    a first printed circuit board (PCB) provided in an inner space of the housing;
    a second PCB provided in the inner space of the housing and spaced apart from the first PCB;
    an antenna module provided in the inner space of the housing; and
    a flexible PCB (FPCB) connecting the first PCB and the second PCB and extending in a first direction through the antenna module,
    wherein the antenna module comprises:
        a base member comprising a first basesurface, and a second basesurface opposite to the first basesurface and facing the FPCB;
        a first pattern layer provided on the first basesurface of the base member and forming a first coil pattern, wherein, along a second direction perpendicular to the first direction, the first coil pattern at least partially overlaps the FPCB;
        a second pattern layer provided on the second basesurface of the base member and forming a plurality of second coil patterns, wherein, along the second direction, the plurality of second coil patterns at least partially overlaps the first coil pattern and does not overlap the FPCB; and
        conductive vias between the first pattern layer and the second pattern layer that electrically couple the first coil pattern with a second coil pattern of the plurality of second coil patterns.

* * * * *